(12) United States Patent
Tokoyoda

(10) Patent No.: US 10,649,831 B2
(45) Date of Patent: May 12, 2020

(54) PROCESSOR AND MEMORY ACCESS METHOD

(71) Applicant: FUJITSU LIMITED, Kawasaki-shi, Kanagawa (JP)

(72) Inventor: Akio Tokoyoda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 16/011,685

(22) Filed: Jun. 19, 2018

(65) Prior Publication Data
US 2019/0004896 A1 Jan. 3, 2019

(30) Foreign Application Priority Data
Jun. 29, 2017 (JP) ................... 2017-127003

(51) Int. Cl.
*G06F 11/07* (2006.01)
*G06F 11/10* (2006.01)
*G06F 12/0877* (2016.01)
*G06F 12/06* (2006.01)
*G06F 12/0895* (2016.01)
*G06F 13/16* (2006.01)

(52) U.S. Cl.
CPC .......... *G06F 11/076* (2013.01); *G06F 11/073* (2013.01); *G06F 11/1056* (2013.01); *G06F 12/06* (2013.01); *G06F 12/0877* (2013.01); *G06F 12/0895* (2013.01); *G06F 13/16* (2013.01); *G06F 2201/81* (2013.01); *G06F 2212/1032* (2013.01)

(58) Field of Classification Search
CPC .................................................... G06F 11/076
See application file for complete search history.

(56) References Cited

U.S. PATENT DOCUMENTS

| 5,974,576 A | 10/1999 | Zhu | |
|---|---|---|---|
| 8,443,263 B2* | 5/2013 | Selinger | G06F 11/1068 714/768 |
| 2005/0099834 A1* | 5/2005 | Funaba | G11C 5/04 365/63 |

(Continued)

FOREIGN PATENT DOCUMENTS

| JP | 10-55320 | 2/1998 |
|---|---|---|
| JP | 2010-170462 | 8/2010 |
| JP | 2012-108726 | 6/2012 |

*Primary Examiner* — Steve N Nguyen
(74) *Attorney, Agent, or Firm* — Fujitsu Patent Center

(57) ABSTRACT

A processor includes a memory-controller that controls an access to a memory which includes through electrode groups and a memory chip including a storage areas connected to each of the through-electrode groups including through-electrodes, and that includes an address-filter circuit that outputs an access address included in a read access request of reading data from the memory, as an error address, a counter that includes counters corresponding to the through-electrode groups and updates a counter value of the counter corresponding to the through-electrode group connected to the storage area indicated by the received error address, a first circuit that outputs area information indicating the storage area connected to the through-electrode group corresponding to the counter having a counter value which is greater than a predetermined value, and a second circuit that outputs an access request to the storage area indicated by the area information output from the first circuit.

12 Claims, 15 Drawing Sheets

(56) References Cited

U.S. PATENT DOCUMENTS

2009/0132876 A1* 5/2009 Freking ................ G06F 11/106
                                                         714/723
2016/0224412 A1* 8/2016 Healy ................. G06F 11/1008
2016/0239375 A1* 8/2016 Fee .................... G06F 11/1064

* cited by examiner

| MG3 (MR3) AD[3:0]=3 | MG7 (MR7) AD[3:0]=7 | MG11 (MR11) AD[3:0]=11 | MG15 (MR15) AD[3:0]=15 |
| MG2 (MR2) AD[3:0]=2 | MG6 (MR6) AD[3:0]=6 | MG10 (MR10) AD[3:0]=10 | MG14 (MR14) AD[3:0]=14 |
| MG1 (MR1) AD[3:0]=1 | MG5 (MR5) AD[3:0]=5 | MG9 (MR9) AD[3:0]=9 | MG13 (MR13) AD[3:0]=13 |
| MG0 (MR0) AD[3:0]=0 | MG4 (MR4) AD[3:0]=4 | MG8 (MR8) AD[3:0]=8 | MG12 (MR12) AD[3:0]=12 |

PROCESSOR AND MEMORY ACCESS METHOD

CROSS-REFERENCE TO RELATED APPLICATION

This application is based upon and claims the benefit of priority of the prior Japanese Patent Application No. 2017-127003, filed on Jun. 29, 2017, the entire contents of which are incorporated herein by reference.

FIELD

The embodiments discussed herein are related to a processor and a memory access method.

BACKGROUND

In memories such as a synchronous dynamic random-access memory (SDRAM), errors may occur in data read from the memory by an influence of noise and the like occurring in the memory. The errors which have occurred are corrected by, for example, a memory controller that controls an access of the memory. For example, the memory controller counts the number of times of correcting errors for each address space allocated to the memory. The memory controller issues a fault notification to a diagnostic device in a case where the count value reaches a threshold value (for example, see Japanese Laid-open Patent Publication No. 2012-108726 and Japanese Laid-open Patent Publication No. 2010-170462). In a memory monitoring system that monitors a memory, errors are corrected in a case where a correctable error occurs, and the alarm is raised in a case where a frequency of errors occurring exceeds a predetermined threshold value (for example, see Japanese Laid-open Patent Publication No. 10-55320).

The occurrence of a correctable error may serve as a sign of an occurrence of an uncorrectable error. Therefore, if an occurrence of a situation in which the number of times of correcting errors reaches a predetermined threshold value is detected as a sign of the occurrence of an uncorrectable error, an occurrence of serious troubles such as system down is avoided. However, a method of causing a memory to perform an access operation having difficulty in the occurrence of an uncorrectable error, based on a situation in which a correctable error occurs has not been proposed.

SUMMARY

According to an aspect of the embodiments, a processor includes a memory controller that controls an access to a memory which includes a plurality of through electrode groups and a memory chip including a plurality of storage areas connected to the plurality of through electrode groups, each of the through electrode groups including a plurality of through electrodes, wherein the memory controller includes an address-filter circuit that outputs an access address included in a read access request of reading data from the memory, as an error address, where a response which is output from the memory in response to the read access request includes error information indicating that an error in the data has been corrected by the memory and a case where it is determined that the error in the data at the access address included in the read access request has been corrected for a first time, a counter that includes a plurality of counters corresponding to the plurality of through electrode groups and updates a counter value of the counter corresponding to the through electrode group connected to the storage area indicated by the received error address, an area-information-output circuit that outputs area information indicating the storage area connected to the through electrode group corresponding to the counter having a counter value which is greater than a predetermined value, and a request issuing circuit that outputs an access request to the storage area indicated by the area information output from the area-information-output circuit and an access request to the storage area adjacent to the storage area indicated by the area information output from the area-information-output circuit, to the memory with a predetermined time gap.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of arrangement of storage area groups included in the memory circuit illustrated in FIG. 5;

DESCRIPTION OF EMBODIMENTS

Hereinafter, embodiments will be described with reference to the drawings.

Figure 1:
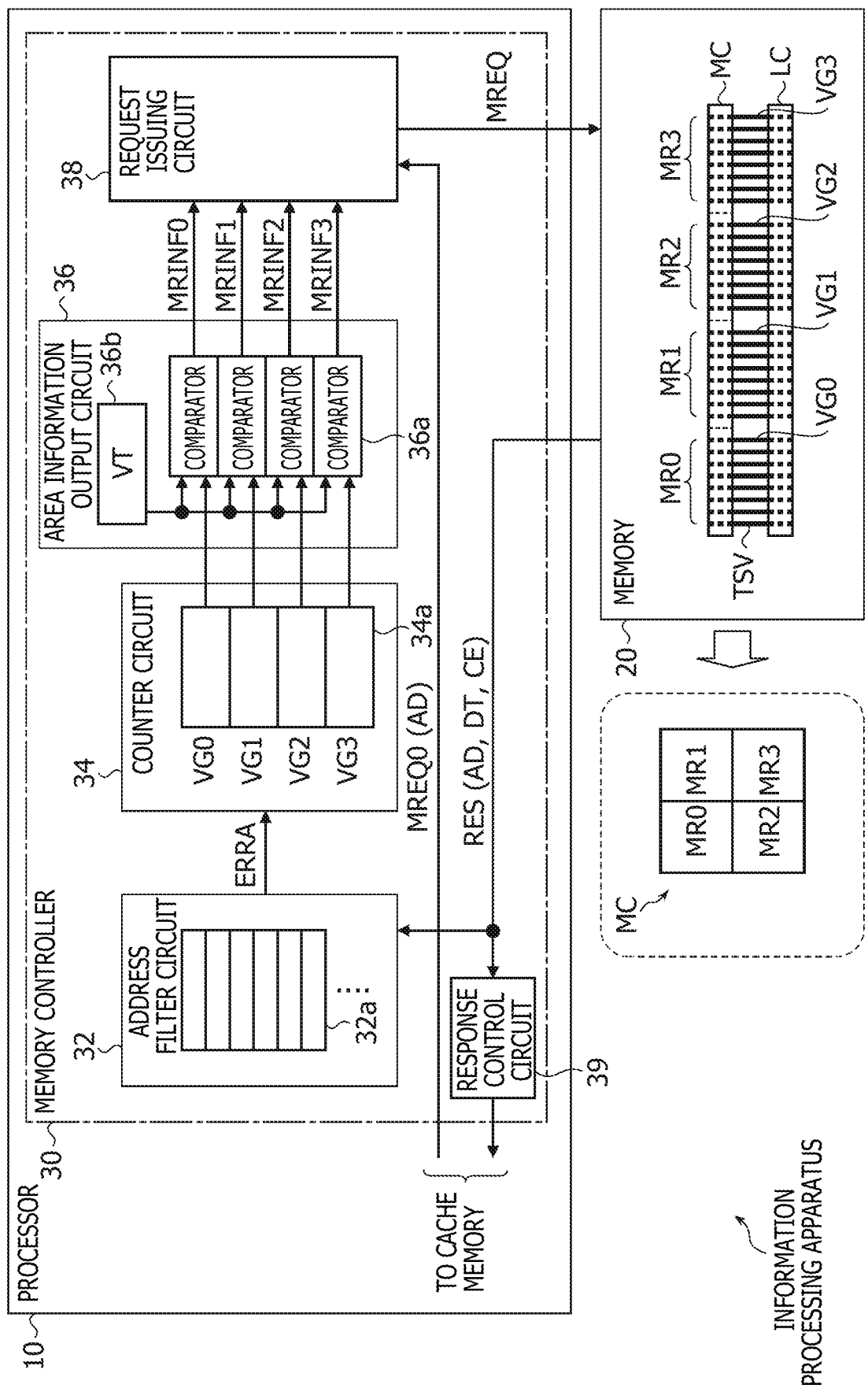
FIG. 1 is a diagram illustrating a processor and a memory access method according to an embodiment.

FIG. 1 illustrates a processor and a memory access method according to an embodiment. A processor 10 illustrated in FIG. 1 includes a memory controller 30 that controls an access to a memory 20. The processor 10 and the memory 20 are connected to, for example, a motherboard of an information processing apparatus such as a server.

For example, the memory 20 includes a memory chip MC and a logic chip LC that controls an operation of the memory chip MC. The memory chip MC has a plurality of storage areas MR0 to MR3. The number of memory chips MC in the memory 20 is not limited to 1 and the number of storage areas MR in the memory chip MC is not limited to 4. Memory chips MC and the logic chip LC are connected to each other by a plurality of through silicon vias (TSVs), for example. A semiconductor substrate of the memory chips MC and the logic chip LC is not limited to a silicon substrate.

The storage areas MR0 to MR3 are connected to the logic chip LC by through electrode groups VG (VG0 to VG3) including a predetermined number of TSVs. The TSV is an example of a through electrode. In FIG. 1, the number appended to the sign VG indicating the through electrode group is the same as the number appended to the sign MR indicating the storage area connected to the through electrode group VG.

For example, in a case where a memory cell that holds data in the memory chip MC has a physical defect and data read from the memory cell having the defect includes a correctable error, the memory 20 corrects an error in the data and outputs a response including data obtained by correcting the error. For example, the error is corrected by the logic chip LC.

Regarding a defective memory cell in which a storage node is fixed to logic 0, data read from the defective memory cell is fixed to logic 0. Therefore, data of logic 1, which has been written in the defective memory cell is not held and data of logic 0 is normally read from the defective memory cell. In a case where data of logic 1, which has been written in the defective memory cell is read from the defective memory cell, errors are normally corrected. Thus, in a read access operation of reading data from a memory cell having a physical defect, errors occurring at the same address AD are corrected many times. In a case where data of logic 0, which has been written in the defective memory cell is read, the data of logic 0 is read. Thus, an error is not corrected.

A signal of data and the like, which is input and output to and from the memory chip MC is transmitted through the TSV, and thus the signal may be influenced by noise occurring in the TSV. For example, the magnitude of the noise included in the signal transmitted to the TSV varies depending on variation in size of the TSV, variation in distance between TSVs adjacent to each other, or the like occurring by a manufacturing process and the like of the memory 20. In a case where the logical value of data which is read from a memory cell and is transmitted to the TSV is inverted by noise and thus a correctable error occurs, the memory 20 corrects the error of the data and outputs the resultant to the outside of the memory.

In the following descriptions, a through electrode group VG in which noise easily occurs by an influence of a signal transmitted to the adjacent through electrode group VG is referred to as a target through electrode group VG and a storage area MR connected to the target through electrode group VG is referred to as a target storage area MR. In a case where noise by crosstalk and the like occurs in the target through electrode group VG by an influence of a signal transmitted to a through electrode group VG adjacent to the target through electrode group VG, an error easily occurs in data transmitted to the target through electrode group VG. For example, if noise of the target through electrode group VG connected to the target storage area MR in which a read access operation is performed is increased by an influence of a signal transmitted to the adjacent through electrode group VG, data read from the target storage area MR may be corrupted.

An error occurring in the target storage area MR by noise occurring by crosstalk and the like from the adjacent through electrode group VG easily and randomly occurs because of depending on a pattern and the like of a signal transmitted to the adjacent through electrode group VG. In other words, a probability that an error occurring by noise occurring by crosstalk and the like from the adjacent through electrode group VG occurs at the same address AD plural number of times is lower than a probability that an error occurring by a physical defect in a memory cell occurs at the same address AD plural number of times.

The memory controller 30 includes an address filter circuit 32, a counter 34, an area information output circuit 36, a request issuing circuit 38, and a response control circuit 39. The address filter circuit 32 receives a response RES which is output from the memory 20 in response to a read access request issued to the memory 20 by the request issuing circuit 38. For example, the response RES includes an address AD included in the read access request, data DT read from the memory 20, and error information correctable error (CE) indicating whether or not an error in the data DT is corrected in the memory 20. The address AD included in the read access request is an example of an access address.

For example, in a case where the data DT included in the response RES is data in which an error has been corrected in the memory 20, the error information CE is set to logic 1. In a case where the data DT included in the response RES is output from the memory 20 in a state where an error is not corrected in the memory 20 (case where there is no error), the error information CE is set to logic 0.

In a case where the address filter circuit 32 determines that an error in the data DT at the address AD included in the response RES has been corrected for the first time, the address filter circuit 32 outputs the address AD included in the response RES to the counter 34 as an error address ERRA. That is, the address filter circuit 32 outputs the error address ERRA indicating an area in which an error has been corrected in the memory 20. In a case where the address filter circuit 32 determines that an error in the data DT at the address AD included in the response RES has been corrected for the first time, the address filter circuit 32 stores the address AD included in the response RES, in a holding area 32a. The holding area 32a has a plurality of entries for holding the address AD and is used for determination of whether or not an error in the data DT at the address AD included in the response RES is corrected for the first time.

In a case where the holding area 32a does not hold the address AD included in the response RES including error information CE of logic 1, the address filter circuit 32 determines that an error in the data DT at the address AD has been corrected for the first time. Then, the address filter circuit outputs an error address ERRA to the counter 34. In other words, in a case where the holding area 32a does not hold the address AD included in the response RES including the error information CE of logic 1, the address filter circuit 32 determines that a correctable error caused by noise has occurred, and outputs an error address ERRA to the counter 34.

In a case where the holding area 32a holds the address AD included in the response RES including the error information CE of logic 1, the address filter circuit 32 determines that an error in the data DT at the address AD has been previously corrected. In this case, the address filter circuit 32 hinders an output of the error address ERRA to the counter 34. In other words, in a case where the holding area 32*a* holds the address AD included in the response RES including the error information CE of logic 1, the address filter circuit 32 determines that a correctable error caused by a physical defect has occurred and hinders an output of the error address ERRA. The address filter circuit 32 does not cause the same address AD to be held in a plurality of holding areas 32*a*.

An error address ERRA corresponding to an address AD of a correctable error which randomly occurs by noise and the like except for an address AD of a correctable error occurring by a physical defect can be output to the counter 34 by the address filter circuit 32. That is, the address filter circuit 32 functions as a filter of causing an error address ERRA of a correctable error occurring by a physical defect not to pass through the address filter circuit and causing an error address ERRA of a correctable error which randomly occurs by noise and the like to pass therethrough.

As described above, in a case where the address filter circuit 32 determines that an error in the data DT at the address AD included in the response RES has been corrected for the first time, the address filter circuit 32 outputs the error address ERRA to the counter 34. Therefore, even in a case where an address AD of a correctable error occurring by a physical defect is detected for the first time, the error address ERRA is output to the counter 34. However, as will be described later, the number of times of correcting errors, which is held in each counter 34*a* of the counter 34, is compared to a threshold value VT (for example, 255 times) by a comparator 36*a* of the area information output circuit 36. Therefore, even in a case where the number of times of correcting errors, which is held by the counter 34, includes the number of times of correcting errors occurring by a physical defect, operations of the area information output circuit 36 and the request issuing circuit 38 are hardly influenced.

The counter 34 includes a plurality of counters 34*a* which respectively correspond to the through electrode groups VG (VG0 to VG3). Whenever the counter 34 receives an error address ERRA from the address filter circuit 32, the counter 34 updates a counter value of a counter 34*a* corresponding to a through electrode group VG connected to a storage area MR indicated by the received error address ERRA. The counter value of each of the counters 34*a* indicates the number of times of correcting errors for each storage area MR connected to the through electrode group VG. For example, in a case where an error address ERRA received from the address filter circuit 32 indicates a storage area MR0, the counter 34 increases the counter value of the counter 34*a* corresponding to the through electrode group VG0 connected to the storage area MR0, by "1". The counter 34 outputs the counter value of each of the counters 34*a* to the area information output circuit 36.

The area information output circuit 36 includes 4 comparators 36*a* which respectively correspond to 4 counters 34*a* of the counter 34, and a threshold holding circuit 36*b* that holds a threshold value VT indicating predetermined number of times. That is, the area information output circuit 36 includes the 4 comparators 36*a* which respectively correspond to the through electrode groups VG0 to VG3 (that is, storage areas MR0 to MR3). The number of times indicated by the threshold value VT is not particularly limited, and, for example, 255 times.

Each of the comparators 36*a* compares the counter value held by the corresponding counter 34*a* in the counter 34, to the threshold value VT. In a case where the counter value is greater than the threshold value VT, each of the comparators 36*a* outputs area information MRINF (any of MRINF0 to MRINF3) indicating a storage area MR connected to a through electrode group VG corresponding to the comparator 36*a*, to the request issuing circuit 38. In a case of outputting the area information MRINF, each of the comparators 36*a* maintains an output state of the area information MRINF. In a case where the number of times of outputting the information is equal to or smaller than the threshold value VT, each of the comparators 36*a* does not output the area information MRINF. The storage area MR indicated by the area information MRINF is a target storage area MR corrected to a target through electrode group VG in which noise easily occurs.

An address AD of a correctable error occurring by a physical defect is almost excluded from the error address ERRA received by the counter 34. Thus, the counter value of each of the counters 34*a* hardly includes the number of times of correcting errors occurring by physical defects. Therefore, the area information output circuit 36 can compare the number of times of correcting errors which randomly occur by noise, to the threshold value VT. In addition, the area information output circuit 36 can accurately determine a storage area MR in which a random error caused by noise easily occurs.

The request issuing circuit 38 receives a memory access request MREQ0 issued from a cache memory and the like of the processor 10, and outputs the received memory access request MREQ0, as a memory access request MREQ, to the memory 20. The request issuing circuit 38 has a request queue in which the memory access request MREQ0 is held in an order of being received.

The request issuing circuit 38 determines whether or not a storage area MR indicated by an address AD included in the memory access request MREQ0 is a target storage area MR indicated by any piece of area information MRINF output by the area information output circuit 36. Here, the memory access request MREQ is an example of an access request and is any of a read access request of reading data from the memory 20 and a write access request of writing data in the memory 20.

In a case where the address AD included in the memory access request MREQ0 indicates the target storage area MR, the request issuing circuit 38 controls an output of the memory access request MREQ corresponding to the memory access request MREQ0, as follows. The request issuing circuit 38 outputs the memory access request MREQ and a memory access request MREQ to a storage area MR adjacent to the target storage area MR as the access target by the above memory access request MREQ, with a predetermined time gap.

In a case where the address AD included in the memory access request MREQ0 does not indicate the target storage area MR, the request issuing circuit 38 controls an output of the memory access request MREQ corresponding to the memory access request MREQ0, as follows. In a case where the target storage area MR is adjacent to another target storage area MR as the access target by the memory access request MREQ, the request issuing circuit 38 outputs the memory access request MREQ and the memory access request MREQ to this target storage area MR, with a predetermined time gap.

Figure 2:
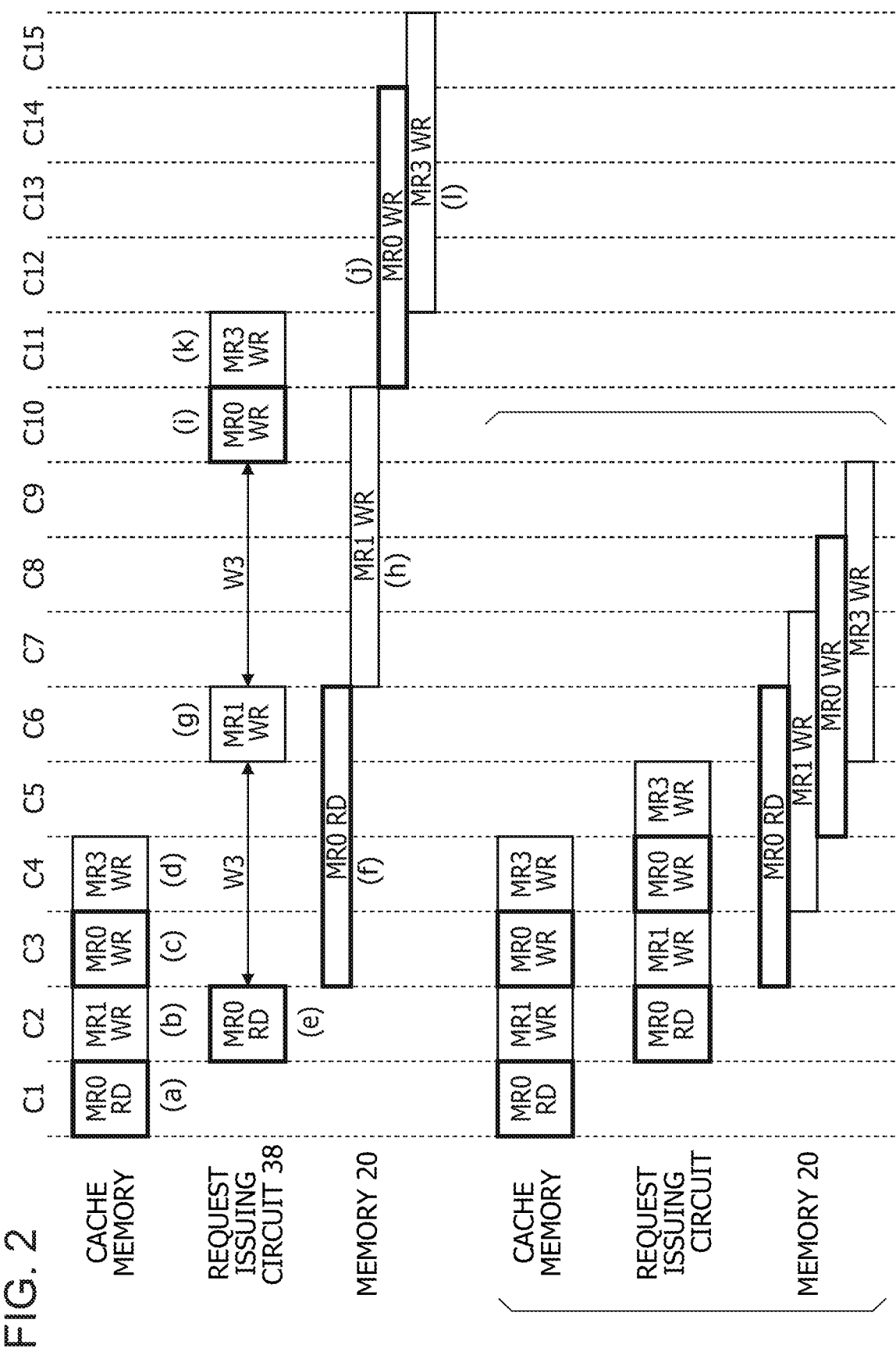
FIG. 2 is a diagram illustrating an example of an operation of an information processing apparatus illustrated in FIG. 1.

For example, the predetermined time gap is a time gap in which memory access operations performed in storage areas MR adjacent to each other by the memory 20 based on the memory access request MREQ do not overlap each other in the memory 20. FIG. 2 illustrates an example of a timing when the memory access request MREQ is output to the memory 20 by the request issuing circuit 38. The memory 20 accesses any storage area MR based on the reception of the memory access request MREQ output by the request issuing circuit 38, and outputs a response RES to the memory controller 30. The response RES to the write access request does not include the data DT and the error information CE.

The response control circuit 39 outputs the response RES to the memory access request MREQ0, to the cache memory based on information included in the response RES received from the memory 20. For example, in a case where the memory access request MREQ0 is a read access request, the response control circuit 39 outputs data DT included in the response RES along with information for identifying the memory access request MREQ0, to the cache memory.

FIG. 2 illustrates an example of an operation of the information processing apparatus illustrated in FIG. 1. That is, FIG. 2 illustrates an example of a memory access method by the memory controller 30 that controls an access to the memory 20. Operations illustrated in a lower bracket in FIG. 2 illustrate an example of an operation of the information processing apparatus including the memory controller including the request issuing circuit that outputs a received memory access request to the memory 20 whenever the memory access request is received from the cache memory.

In FIG. 2, a rectangle indicated by a thick frame indicates a memory access request or an access operation for a target storage area MR (in this example, MR0) in which the number of times of correcting an error is greater than the threshold value VT. That is, the area information output circuit 36 outputs area information MRINF0 corresponding to the target storage area MR0 and does not output pieces of area information MRINF1 to MRINF3 corresponding to other target storage areas MR1 to MR3.

For example, the memory 20 performs an access operation of accessing the memory chip MC based on a memory access request, in 4 cycles. It is assumed that the memory 20 performs the access operation in an order from the received memory access request. The reference sign of RD indicates a read access operation performed by the memory 20 based on a read access request or a read access request. The reference sign of WR indicates a write access operation performed by the memory 20 based on a write access request or a write access request.

Firstly, the cache memory in the processor 10 outputs a read access request to the storage area MR0 in a cycle C1 and outputs a write access request to the storage area MR1 in a cycle C2 ((a) and (b) in FIG. 2). The cache memory outputs a write access request to the storage area MR0 in a cycle C3 and outputs a write access request to the storage area MR3 in a cycle C4 ((c) and (d) in FIG. 2).

The read access request output in the cycle C1 is an access request to the target storage area MR0 in which the number of times of correcting an error is greater than the threshold value VT. Since access operations to the storage areas MR1 and MR2 adjacent to the target storage area MR0 are not performed, the request issuing circuit 38 determines that the access operation to the target storage area MR0 does not overlap the access operations to the storage areas MR1 and MR2. Therefore, the request issuing circuit 38 outputs the read access request to the storage area MR0, to the memory 20 in the cycle C2 ((e) in FIG. 2). The memory 20 performs the read access operation in the cycles C3 to C6, based on the read access request to the storage area MR0 ((f) in FIG. 2).

The write access request received in the cycle C2 is a memory access request to the storage area MR1 adjacent to the target storage area MR0 in which the read access operation is in the process of being performed. Therefore, the request issuing circuit 38 inserts a wait cycle W3 of 3 cycles for the read access request to the storage area MR0, and then outputs the write access request to the memory 20 in the cycle C6 ((g) in FIG. 2). The cycle C6 in which the write access request received in the cycle C2 is output to the memory 20 is a cycle in which the read access operation for the storage area MR0 by the memory 20 is completed.

The memory 20 performs a write access operation in cycles C7 to C10, based on the write access request to the storage area MR1 ((h) in FIG. 2). The memory 20 can perform the read access operation for the target storage area MR0 and the write access operation for the storage area MR1 adjacent to the target storage area MR0 without overlapping each other, by the insertion of the wait cycle W3. Since the access operations do not overlap each other, a signal transmitted to the target through electrode group VG by the access operation for the target storage area MR0 is not influenced by a signal which is transmitted to the through electrode group by the access operation for the storage area MR1. Thus, it is possible to suppress an occurrence of noise in data which is read from the storage area MR0 and is transmitted to the target through electrode group VG by an influence of a signal transmitted to a through electrode group VG adjacent to the target through electrode group VG. As a result, it is possible to suppress an occurrence of a situation in which an error occurs in data read from the storage area MR0 connected to the target through electrode group VG in which noise easily occurs, by the noise.

In the target storage area MR0 in which a random error easily occurs, in a case where correctable errors continuously occur, the correctable errors may act as an uncorrectable error in data. In a case where an uncorrectable error occurs in data, the operation of the information processing apparatus is suspended and the memory 20 is replaced with another memory 20. In the processor 10 including the memory controller 30 illustrated in FIG. 1, overlapping an access operation for the target storage area MR0 and an access operation for the storage area MR1 adjacent to the target storage area MR0 can be avoided. Thus, it is possible to suppress the occurrence of an uncorrectable error in data in the target storage area MR0. As a result, it is possible to reduce a frequency of replacing the memory 20 by the occurrence of an uncorrectable error in data, in comparison to that in the related art.

The write access request received in the cycle C3 is a memory access request to the target storage area MR0 in which the number of times of correcting an error has exceeded the threshold value VT. The memory 20 performs the write access operation for the storage area MR1 adjacent to the target storage area MR0 in the cycles C7 to C10. Therefore, the request issuing circuit 38 outputs the memory access request to the storage area MR1 in the cycle C6, and then inserts the wait cycle W3 of 3 cycles.

After the wait cycle W3 elapses, the request issuing circuit 38 outputs the write access request for the storage area MR0, which has been received in the cycle C3, to the memory 20 in the cycle C10 ((i) in FIG. 2). The cycle C10 in which the write access request to the storage area MR0 is output to the memory 20 is a cycle in which the write access operation for the storage area MR1 by the memory 20 is completed.

The memory 20 performs the write access operation in cycles C11 to C14, based on the write access request to the storage area MR0 ((j) in FIG. 2). The memory 20 can perform the write access operation for the storage area MR1 adjacent to the target storage area MR0 and the write access operation for the target storage area MR0 without overlapping each other, by the insertion of the wait cycle W3. Thus, it is possible to suppress an occurrence of noise in data which is written in the storage area MR0 and is transmitted to the target through electrode group VG by an influence of a signal transmitted to the adjacent through electrode group VG. As a result, it is possible to suppress an occurrence of a situation in which erroneous due to noise is written in the storage area MR0 and to suppress an occurrence of an uncorrectable error in data read from the storage area MR0 after the write operation.

The write access request received in the cycle C4 is a memory access request to the storage area MR3 which is not adjacent to the target storage area MR0 in which the access operation is started in the cycle C11. Therefore, the request issuing circuit 38 outputs the write access request to the storage area MR3, to the memory 20 in the cycle C11 next to the cycle C10 in which the write access request to the storage area MR0 has been output ((k) in FIG. 2).

The memory 20 performs the write access operation in cycles C12 to C15, based on the write access request to the storage area MR3 ((l) in FIG. 2). The access operation for the storage area MR0 in which a random error occurs easier than that in other storage areas MR1 to MR3 and the access operation for the storage area MR3 which is not adjacent to the target storage area MR0 can be performed with overlapping each other. Thus, it is possible to improve access efficiency in comparison to a case where the access operations are caused not to overlap each other.

In operations in a bracket, in which the request issuing circuit 38 outputs the request to the memory 20 in order whenever the memory access request is received from the cache memory, the access operations for the memory 20 are performed with overlapping each other, regardless of a positional relationship between the storage areas MR0 to MR3. In a case where the access operation for the target storage area MR0 overlaps the access operation for the storage area MR1 or the storage area MR2 which is adjacent to the target storage area MR0, an error easily occurs in data read from the target storage area MR0, by an influence of noise. Thus, in a case where correctable errors continuously occur in the target storage area MR0, the correctable errors may act as an uncorrectable error. In a case where an uncorrectable error occurs, an operation of the information processing apparatus is suspended and thus reliability is decreased. In other words, in the information processing apparatus illustrated in FIG. 1, it is possible to suppress the occurrence of an uncorrectable error and thus to suppress the decrease of reliability.

As described above, in the embodiment illustrated in FIGS. 1 and 2, effects as follows can be obtained. An address AD of a correctable error which randomly occurs by noise except for an address AD of a correctable error occurring by a physical defect can be output, as the error address ERRA, to the counter 34 by the address filter circuit 32. Therefore, the area information output circuit 36 can compare the number of times of correcting errors which randomly occur by noise, to the threshold value VT. In addition, the area information output circuit 36 can accurately determine a storage area MR in which a random error caused by noise easily occurs.

The request issuing circuit 38 outputs the memory access request to the target storage area MR0 in which the number of times of correcting an error has exceeded the threshold value VT and the memory access requests to the storage areas MR1 and MR2 adjacent to the target storage area MR0, to the memory 20 with a predetermined time gap. Thus, the access operation for the target storage area MR0 and the access operations for the storage areas MR1 and MR2 adjacent to the target storage area MR0 can be performed without overlapping each other. Accordingly, it is possible to reduce noise occurring in the target through electrode group VG by an influence of the operations of the storage areas MR1 and MR2.

As a result, in the target storage area MR0, it is possible to suppress the occurrence of a random error and to suppress the occurrence of an uncorrectable error. Thus, it is possible to reduce the frequency of replacing the memory 20 by the occurrence of an uncorrectable error in data and to reduce a period in which the operation of the information processing apparatus is suspended, in comparison to those in the related art. That is, in comparison to a processor which does not include the memory controller 30 illustrated in FIG. 1, it is possible to improve reliability of the memory 20 and the information processing apparatus. As described above, in the memory 20 having more difficulty in replacement than a memory module and the like, suppression of the occurrence of an uncorrectable error is effective because the information processing apparatus is stably operated.

Figure 3:
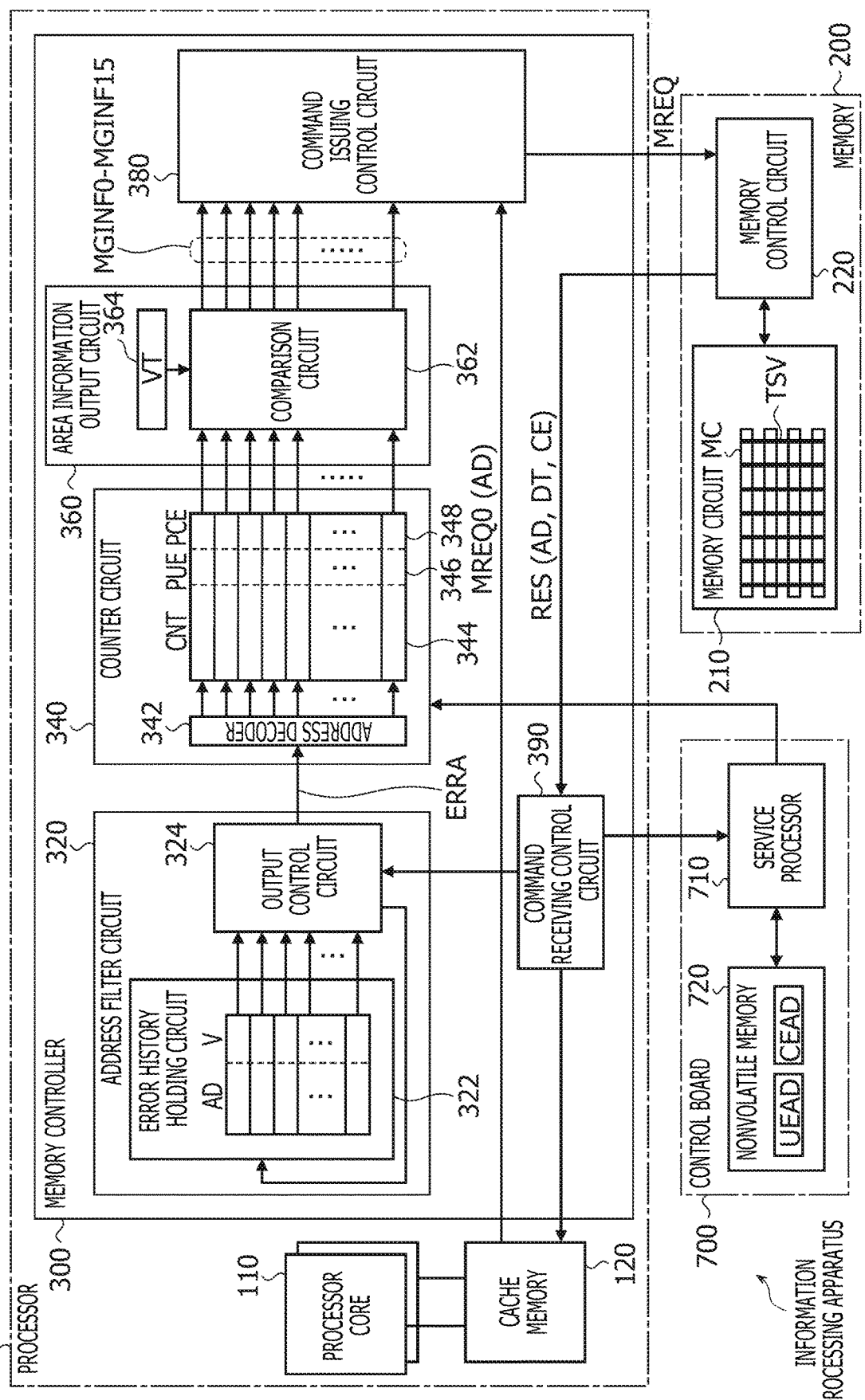
FIG. 3 is a diagram illustrating a processor and a memory access method according to another embodiment.

FIG. 3 illustrates a processor and a memory access method according to another embodiment. Components which are the same or similar to the components illustrated in FIG. 1 are denoted by the same reference signs and detailed descriptions thereof will be not repeated. Detailed descriptions of operations which are similar to the operations illustrated in FIGS. 1 and 2 will not be repeated.

A processor 100 illustrated in FIG. 3 includes a plurality of processor cores 110, a cache memory 120, and a memory controller 300 that controls an access to a memory 200. The processor 100 and the memory 200 are connected to, for example, a motherboard of an information processing apparatus such as a server. An information processing apparatus illustrated in FIG. 3 includes a control board 700 for controlling operations of electronic components such as the processor 100, which are included in the information processing apparatus. The control board 700 includes a service processor 710 and a nonvolatile memory 720.

Each of the processor cores 110 issues a read command to the cache memory 120, for example, in a case where a load command is fetched. The cache memory 120 outputs holding data to the processor core 110 in a case where data corresponding to the read command is held (cache hit). The cache memory 120 issues a read access request which is a memory access request MREQ0 corresponding to the read command, to the memory controller 300 in a case where the data corresponding to the read command is not held (cache miss).

Figure 5:
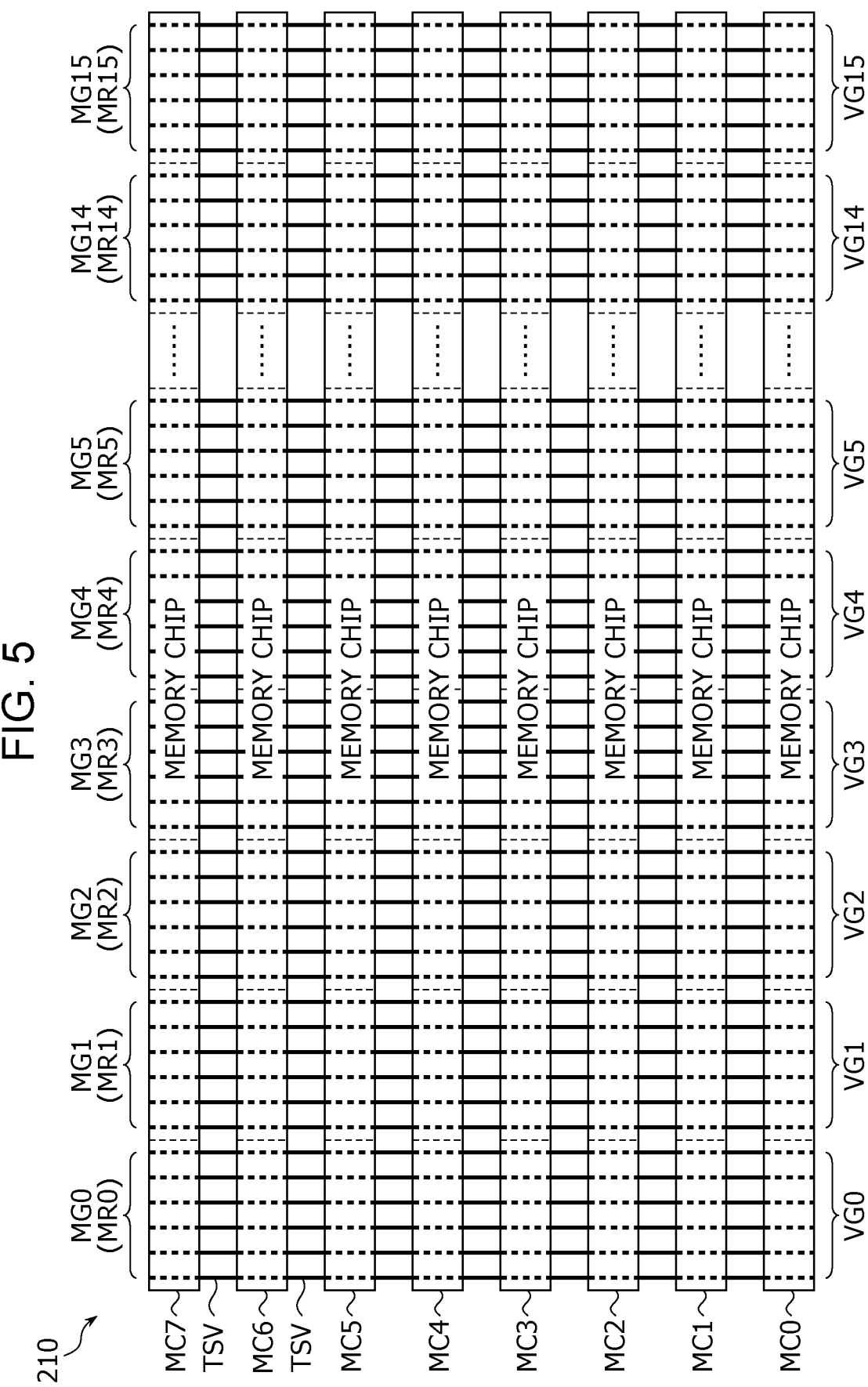
FIG. 5 is a diagram illustrating an example of a memory circuit illustrated in FIG. 3.

The memory 200 includes a memory circuit 210 and a memory control circuit 220 that controls an operation of the memory circuit 210. The memory circuit 210 includes a plurality of memory chips MC which are stacked, and TSVs connecting the memory chips MC to each other. A signal of data and the like, which is input and output to and from each of the memory chips MC is transmitted through other memory chips MC and the TSVs. Thus, the signal may be influenced by noise occurring in these other memory chips MC and the TSVs. FIG. 5 illustrates an example of the memory circuit 210. In a case where the memory control circuit 220 has a form of a logic chip, the memory control circuit 220 may be connected to the memory chip MC through TSVs.

For example, the memory 200 is a hybrid memory cube (HMC), a high band with memory (HBM) in which processing power and mounting density of components are higher than a memory module including an SDRAM and the like. The memory such as an HMC or an HBM is mounted, for example, on the motherboard of an information processing apparatus by soldering. Thus, it is difficult to replace such a memory under an environment in which the information processing apparatus is operated as a system. For example, the memory such as an HMC or an HBM is replaced after the information processing apparatus is carried to the base for maintaining the information processing apparatus. On the contrary, for example, a memory module including an SDRAM or the like is inserted into a socket provided on the motherboard of the information processing apparatus. Thus, such a memory module is replaced easier than the memory such as an HMC or an HBM.

The memory controller 300 includes an address filter circuit 320, a counter 340, an area information output circuit 360, a command issuing control circuit 380, and a command receiving control circuit 390. The command issuing control circuit 380 is an example of the request issuing circuit.

The address filter circuit 320 includes an error history holding circuit 322 and an output control circuit 324. The error history holding circuit 322 has a plurality of entries that hold a validity flag V and an address AD of the memory 200 in which data having the corrected error is held. The error history holding circuit 322 is an example of a holding circuit that holds an address AD. The address filter circuit 320 has a function of causing an error address ERRA of a correctable error occurring by a physical defect not to pass and causing an error address ERRA of a correctable error which randomly occurs by noise and the like to pass.

For example, the error history holding circuit 322 holds bits of a predetermined number in an address AD included in a response RES indicating that an error has been corrected, as an address AD. The bits indicate a memory block from which data has been read. Since the error history holding circuit 322 holds some bits of the address AD, it is possible to reduce the circuit size of the error history holding circuit 322 in comparison to a case where all bits of the address AD are held.

For example, the output control circuit 324 outputs bits of a predetermined number in an address AD included in a response RES indicating that an error has been corrected, to the counter 340 as an error address ERRA. The bits indicate a memory block from which data has been read. Since some bits of the address AD are output as the error address ERRA, to the counter 340, it is possible to reduce the circuit size of an address decoder 342 which will be described later, in comparison to a case where all bits of the error address ERRA are output.

Figure 9:
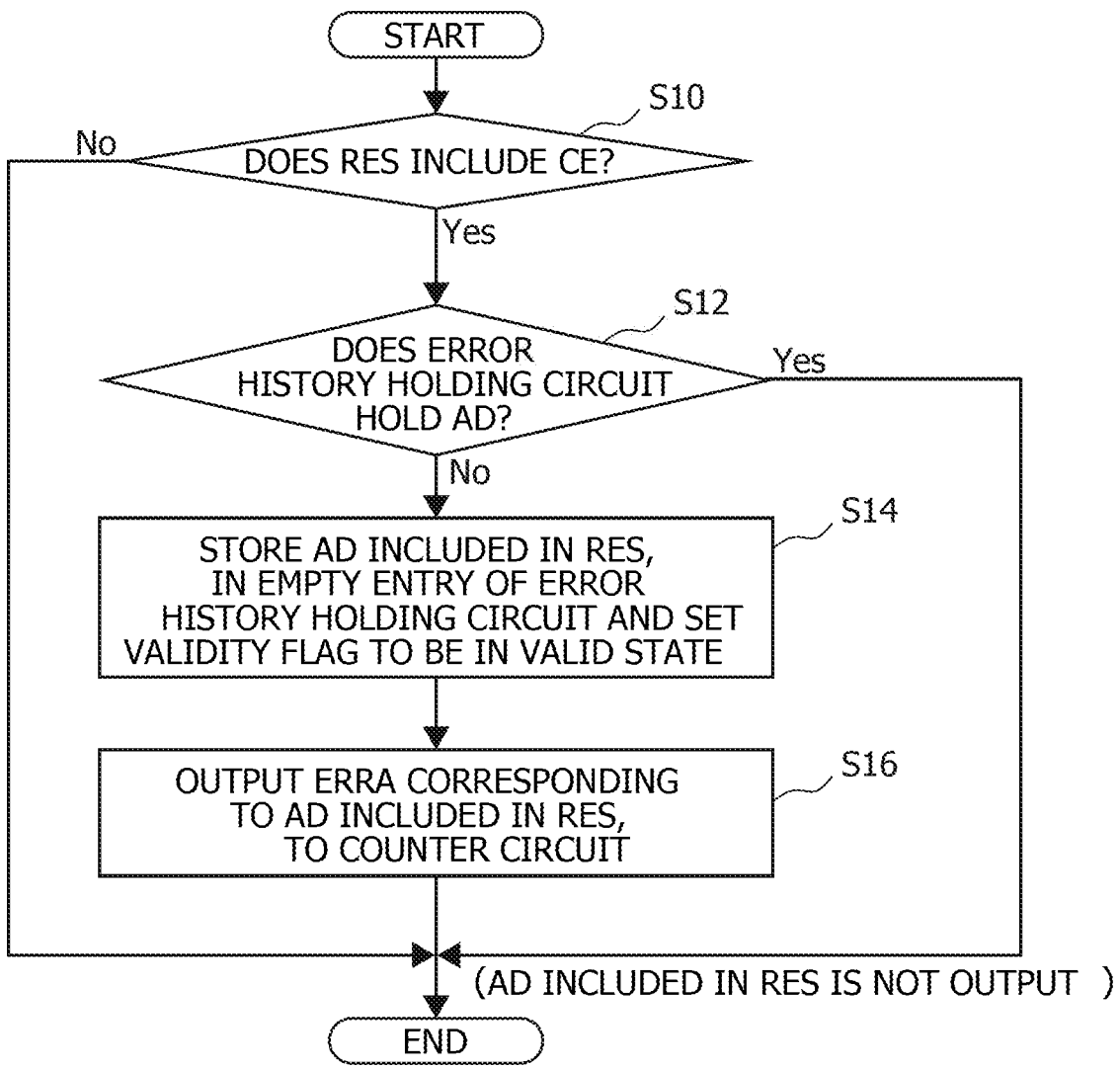
FIG. 9 is a diagram illustrating an example of an operation of an address filter circuit illustrated in FIG. 3.

For example, the memory block is selected by a bank address and a row address in an address AD included in a read access request. The bank address is used for selecting a plurality of banks included in each memory chip MC. The row address is used for a plurality of row areas included in each of the banks. The row area is allocated to each word line which is commonly connected to memory cell columns including a plurality of memory cells. That is, each of the memory blocks includes a plurality of memory cells connected to each word line. FIG. 9 illustrates an example of an operation of the address filter circuit 320.

The counter 340 includes a plurality of counters 344, a plurality of information holding circuits 346, a plurality of information holding circuits 348, and the address decoder 342. Each of the counters 344, each of the information holding circuits 346, and each of the information holding circuits 348 correspond to each of the through electrode groups VG0 and VG15 illustrated in FIG. 5. Each of the information holding circuits 346 is an example of a second information holding circuit. Each of the information holding circuits 348 is an example of a first information holding circuit. The address decoder 342 outputs correction information to the counter 344 corresponding to the through electrode group VG connected to the storage area MR indicated by an error address ERRA, based on the error address ERRA received from the output control circuit 324. The correction information indicates that an error has been corrected.

Each of the counters 344 updates (for example, increases by "1") the counter value CNT whenever receiving the correction information from the address decoder 342. That is, whenever the counter 340 receives the error address ERRA from the address filter circuit 320, the counter 340 updates the counter value CNT of the counter 344 corresponding to the through electrode group VG connected to the storage area MR indicated by the received error address ERRA.

Each of the information holding circuits 346 holds previous error information PUE. For example, the previous error information PUE of logic 1 indicates that an uncorrectable error (UE) has previously occurred in any storage area MR connected to the corresponding through electrode group VG. The previous error information PUE of logic 0 indicates that an uncorrectable error does not have previously occurred in any storage area MR connected to the corresponding through electrode group VG. For example, each of the information holding circuit 346 is reset to logic 0 when the information processing apparatus is shipped.

Each of the information holding circuits 348 holds previous excess information PCE. For example, the previous excess information PCE of logic 1 indicates that the number of times of correcting errors has been previously greater than the threshold value VT in any storage area MR connected to the corresponding through electrode group VG. The previous excess information PCE of logic 0 indicates that the number of times of correcting errors does not have previously exceeded the threshold value VT in any storage area MR connected to the corresponding through electrode group VG. For example, each of the information holding circuits 348 is reset to logic 0 when the information processing apparatus is shipped.

Figure 10:
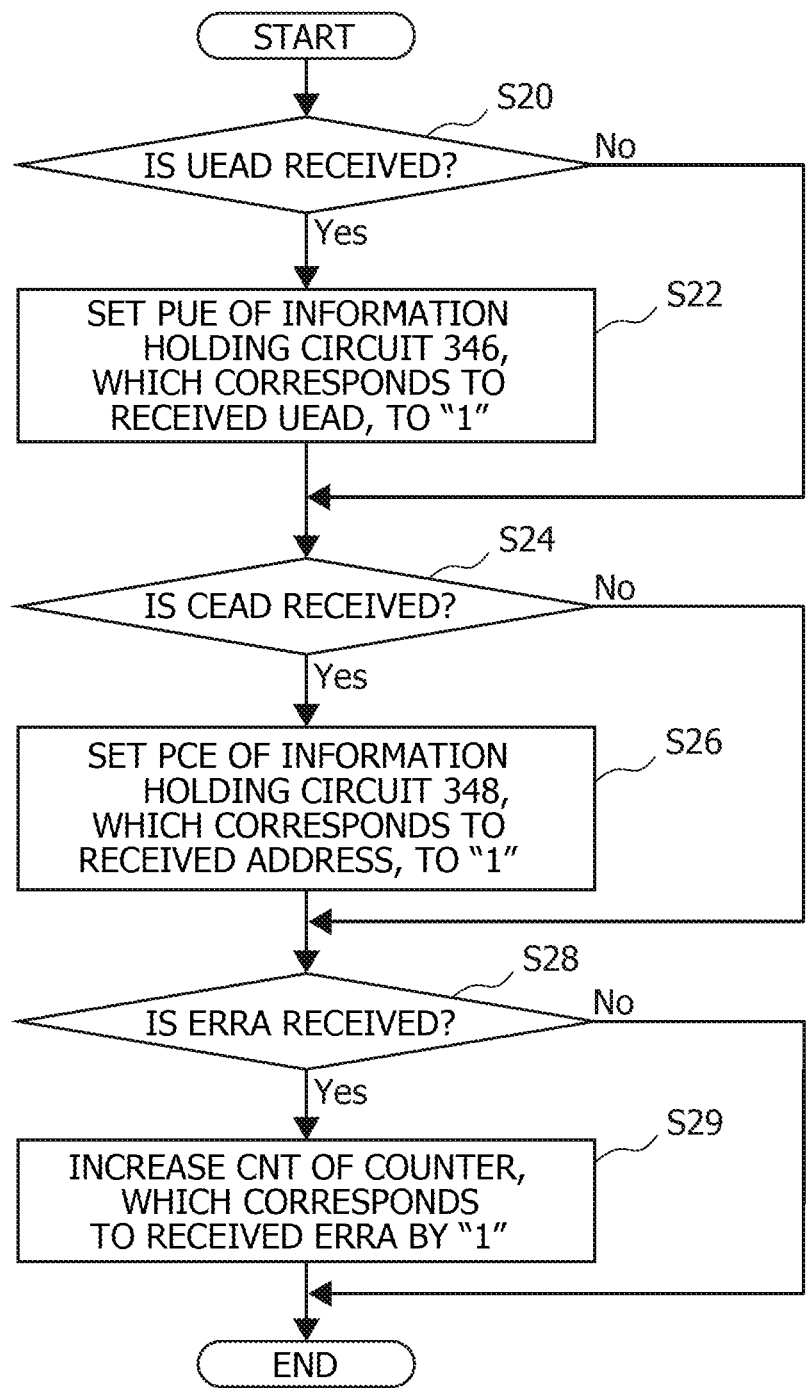
FIG. 10 is a diagram illustrating an example of an operation of a counter illustrated in FIG. 3.

The previous error information PUE and the previous excess information PCE are respectively stored in the information holding circuits 346 and 348 by the service processor 710 of the control board 700, when the processor 100 starts an operation. FIG. 10 illustrates an example of an operation of the counter 340.

The nonvolatile memory 720 of the control board 700 holds an address UEAD and an address CEAD. The address UEAD indicates a storage area MR in which an uncorrectable error has previously occurred in data. The address CEAD indicates a storage area MR in which the number of times of correcting the error in data has been previously greater than the threshold value VT. In a case where the nonvolatile memory 720 holds the address UEAD, the service processor 710 outputs the address UEAD to the counter 340 when the processor 100 starts an operation. In a case where the nonvolatile memory 720 holds the address CEAD, the service processor 710 outputs the address CEAD to the counter 340 when the processor 100 starts an operation. In a case where the counter 340 receives the address UEAD, the counter 340 sets previous error information PUE held by the information holding circuit 346 corresponding to the through electrode group VG connected to the storage area MR indicated by the address UEAD, to logic 1. In a case where the counter 340 receives the address CEAD, the counter 340 sets previous excess information PCE held by the information holding circuit 348 corresponding to the through electrode group VG connected to the storage area MR indicated by the address CEAD, to logic 1.

The service processor 710 stores the address UEAD in the nonvolatile memory 720, based on receiving of a notification indicating the occurrence of an uncorrectable error from the command receiving control circuit 390. The service processor 710 stores the address CEAD in the nonvolatile memory 720 based on the counter value CNT of the counter 344 and the previous excess information PCE, when the power of the processor 100 is cut off.

The area information output circuit 360 includes a comparison circuit 362 and a threshold holding circuit 364. The comparison circuit 362 includes 16 comparators which respectively correspond to 16 counters 344. The threshold holding circuit 364 holds the threshold value VT indicating a predetermined number of times. That is, the area information output circuit 360 includes the 16 comparators which respectively correspond to the through electrode groups VG0 to VG15. Similar to the area information output circuit 36 illustrated in FIG. 1, the area information output circuit 360 causes the comparators to respectively compare the counter value CNT held by the counters 344 to the threshold value VT. The area information output circuit 360 outputs area information MGINF (any of MGINF0 to MGINF15) corresponding to the comparator determining that the counter value CNT is greater than the threshold value VT, to the command issuing control circuit 380. The pieces of area information MGINF0 to MGINF15 are output so as to correspond to the storage area group MG (MG0 to MG15) including the plurality of storage areas MR which are respectively connected to the through electrode groups VG0 to VG15. The storage area group MG indicates a plurality of storage areas MR connected to a common through electrode group VG in a plurality of memory chips MC. Such a storage area group MG is illustrated in FIG. 5.

Figure 11:
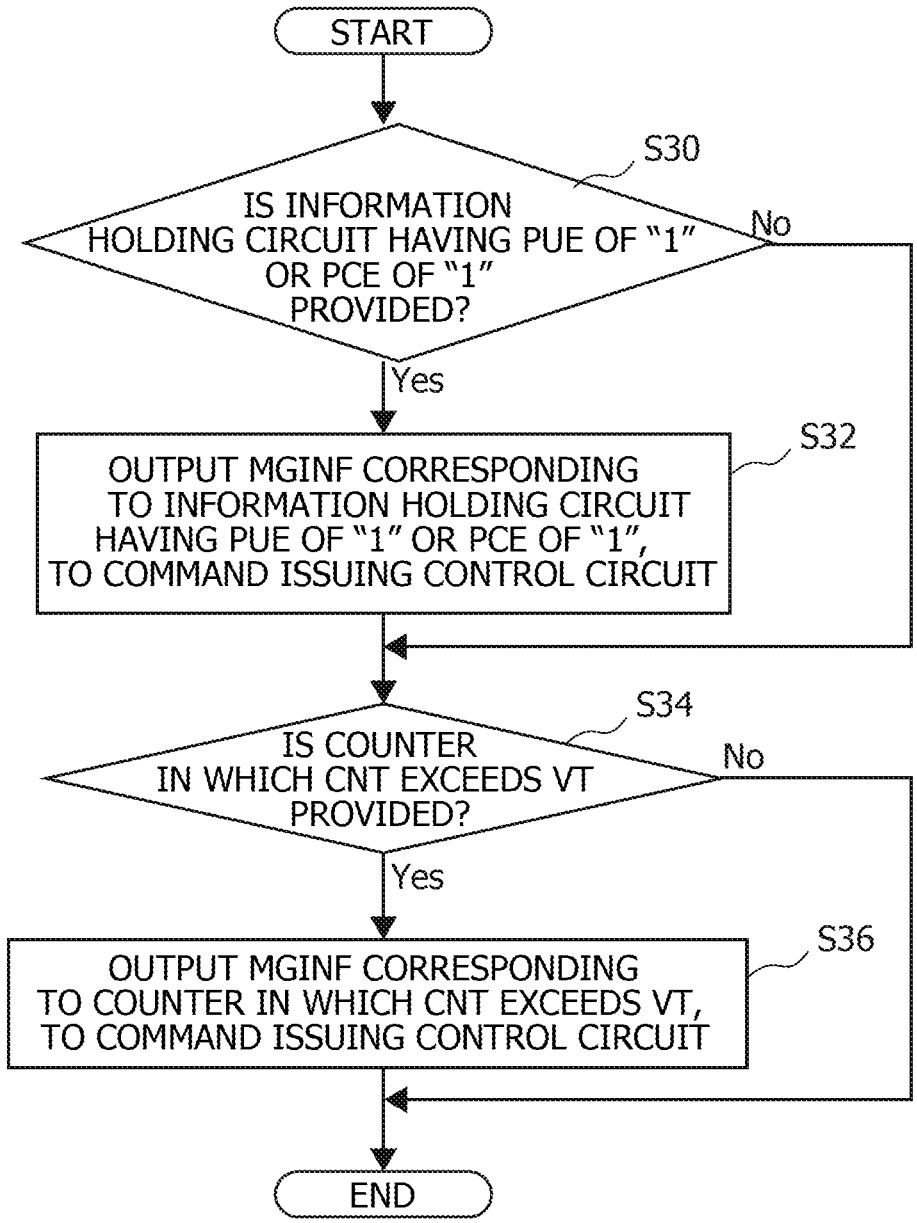
FIG. 11 is a diagram illustrating an example of an operation of an area information output circuit illustrated in FIG. 3.

In a case where the information holding circuit 346 holds the previous error information PUE, the area information output circuit 360 outputs area information MGINF indicating the storage area group MG connected to the through electrode group VG corresponding to the information holding circuit 346 that holds the previous error information PUE, to the command issuing control circuit 380. In a case where the information holding circuit 348 holds the previous excess information PCE, the area information output circuit 360 outputs area information MGINF indicating the storage area group MG connected to the through electrode group VG corresponding to the information holding circuit 348 that holds the previous excess information PCE, to the command issuing control circuit 380. That is, the area information output circuit 360 outputs the area information MGINF to the command issuing control circuit 380 regardless of the counter value CNT of the counter 344, in a case where the counter 340 holds at least any of the previous error information PUE and the previous excess information PCE. FIG. 11 illustrates an example of an operation of the area information output circuit 360.

Figure 4:
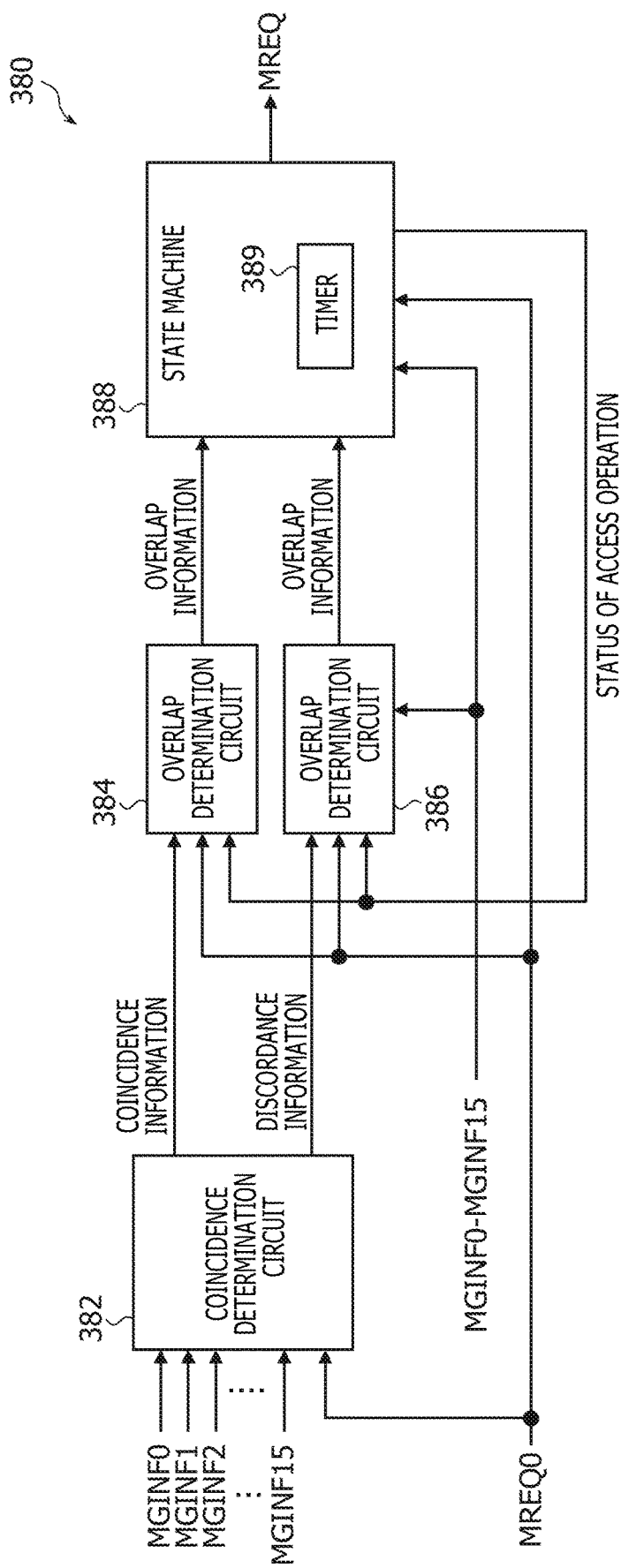
FIG. 4 is a diagram illustrating an example of a command issuing control circuit illustrated in FIG. 3.
Figure 12:
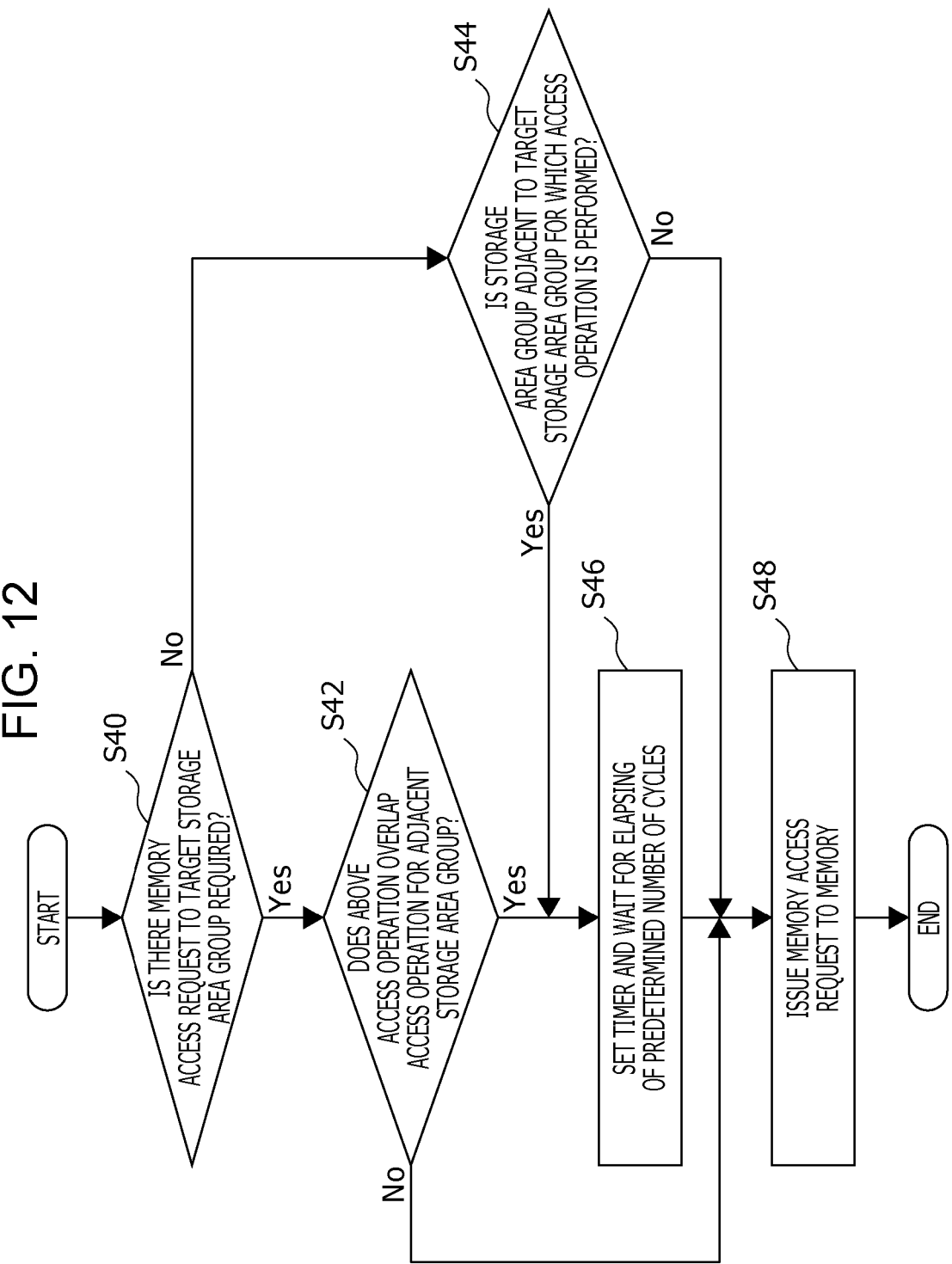
FIG. 12 is a diagram illustrating an example of an operation of the command issuing control circuit illustrated in FIG. 3.

Similarly to the request issuing circuit 38 illustrated in FIG. 1, the command issuing control circuit 380 outputs a memory access request MREQ0 issued from the cache memory 120, to the memory 200 as a memory access request MREQ. The command issuing control circuit 380 has a function of adjusting an output timing of the memory access request MREQ to the memory 200 based on the area information MINF received from the area information output circuit 360. FIG. 4 illustrates an example of the command issuing control circuit 380. FIG. 12 illustrates an example of an operation of the command issuing control circuit 380.

Similarly to the response control circuit 39 illustrated in FIG. 1, the command receiving control circuit 390 outputs a response to the memory access request MREQ0, to the cache memory 120 based on information included in a response RES received from the memory 200. The command receiving control circuit 390 transmits the response RES to the address filter circuit 320 in a case where the response RES received from the memory 200 includes error information CE indicating that an error in data has been corrected. Further, the command receiving control circuit 390 notifies the service processor 710 of the error information included in the response, in a case where the response RES received from the memory 200 includes error information indicating that an uncorrectable error has previously occurred. The command receiving control circuit 390 is an example of a detection circuit detecting that the response RES to the read access request includes the error information CE.

FIG. 4 illustrates an example of the command issuing control circuit 380 illustrated in FIG. 3. The command issuing control circuit 380 includes a coincidence determination circuit 382, overlap determination circuits 384 and 386, and a state machine 388 including a timer 389. The overlap determination circuit 384 is an example of the first overlap determination circuit. The overlap determination circuit 386 is an example of the second overlap determination circuit. The state machine 388 is an example of a timing adjustment circuit.

The coincidence determination circuit 382 determines whether or not the storage area MR as an access target indicated by the address AD included in the memory access request MREQ0 coincides with any of the storage areas MR included in the storage area group MG, which are indicated by the pieces of area information MGINF0 to MGINF15. In a case where the storage area MR as the access target by the memory access request MREQ0 coincides with any of the target storage areas MR included in the storage area group MG, which are indicated by the pieces of area information MGINF0 to MGINF15, the coincidence determination circuit 382 outputs coincidence information to the overlap determination circuit 384. In a case where the storage area MR as the access target by the memory access request MREQ0 is not the target storage area MR, the coincidence determination circuit 382 outputs discordance information to the overlap determination circuit 384. In the following descriptions, the storage area MR which is not the target storage area MR is also referred to as a non-target storage area MR.

The target storage area MR is a storage area MR in which a correctable error occurs easily and randomly by noise and the like. The non-target storage area MR is a storage area MR in which a correctable error by noise and the like occurs less frequently. That is, the coincidence determination circuit 382 outputs the coincidence information in a case of receiving the memory access request MREQ0 corresponding to the target storage area MR, and outputs the discordance information in a case of receiving the memory access request MREQ0 corresponding to the non-target storage area MR.

In a case of receiving the coincidence information, the overlap determination circuit 384 determines whether or not an access operation for the target storage area MR by the memory access request MREQ0 overlaps an access operation for the adjacent storage area group MG which is a storage area group MG adjacent to the storage area group MG including the target storage area MR. A state of the access operation for the storage area group MG adjacent to the storage area group MG including the target storage area MR is received from the state machine 388. In a case of determining that the access operations overlap each other, the overlap determination circuit 384 outputs overlap information to the state machine 388. In a case of not receiving the coincidence information, the overlap determination circuit 384 does not perform an operation of determining overlapping of the access operations and does not output the overlap information to the state machine 388.

In a case of receiving the discordance information, the overlap determination circuit 386 determines whether or not an access operation for the non-target storage area MR by the memory access request MREQ0 overlaps an access operation for the target storage area MR adjacent to the storage area group MG including the non-target storage area MR. The overlap determination circuit 386 detects the target storage area MR adjacent to the storage area group MG including the non-target storage area MR, based on the pieces of area information MGINF0 to MGINF15 and the state of the access operation for the storage area MR, which is received from the state machine 388. In a case of determining that the access operations overlap each other, the overlap determination circuit 386 outputs the overlap information to the state machine 388. In a case of not receiving the discordance information, the overlap determination circuit 386 does not perform an operation of determining overlapping of the access operations and does not output the overlap information to the state machine 388.

For example, the overlap information includes information indicating the storage area MR for which access operations overlap each other. It can be determined whether or not the access operation for the target storage area MR overlaps the access operation for the adjacent storage area group MG which is adjacent to the storage area group MG including the target storage area MR, by the overlap determination circuits 384 and 386.

The state machine 388 has, for example, a request queue for holding the memory access request MREQ0 in an order of receiving the memory access request MREQ0. The state machine 388 outputs the memory access request MREQ0, as the memory access request MREQ, to the memory 200 in an order of being held in the request queue. In a case of receiving the overlap information from any of the overlap determination circuits 384 and 386, the state machine 388 starts the timer 389. The state machine 388 hinders an output of the memory access request MREQ corresponding to the memory access request MREQ0, to the memory 200 until the timer 389 completes measurement of a predetermined time.

That is, in a case where the overlap determination circuit 384 or 386 determines that the access operations overlap each other, the state machine 388 causes an output of the memory access request MREQ to the memory 200 to wait until a timing when the access operations do not overlap each other. Thus, the output timing of the memory access request MREQ in a case where the overlap information is received is delayed from the output timing of the memory access request MREQ in a case where the overlap information is not received.

Figure 7:
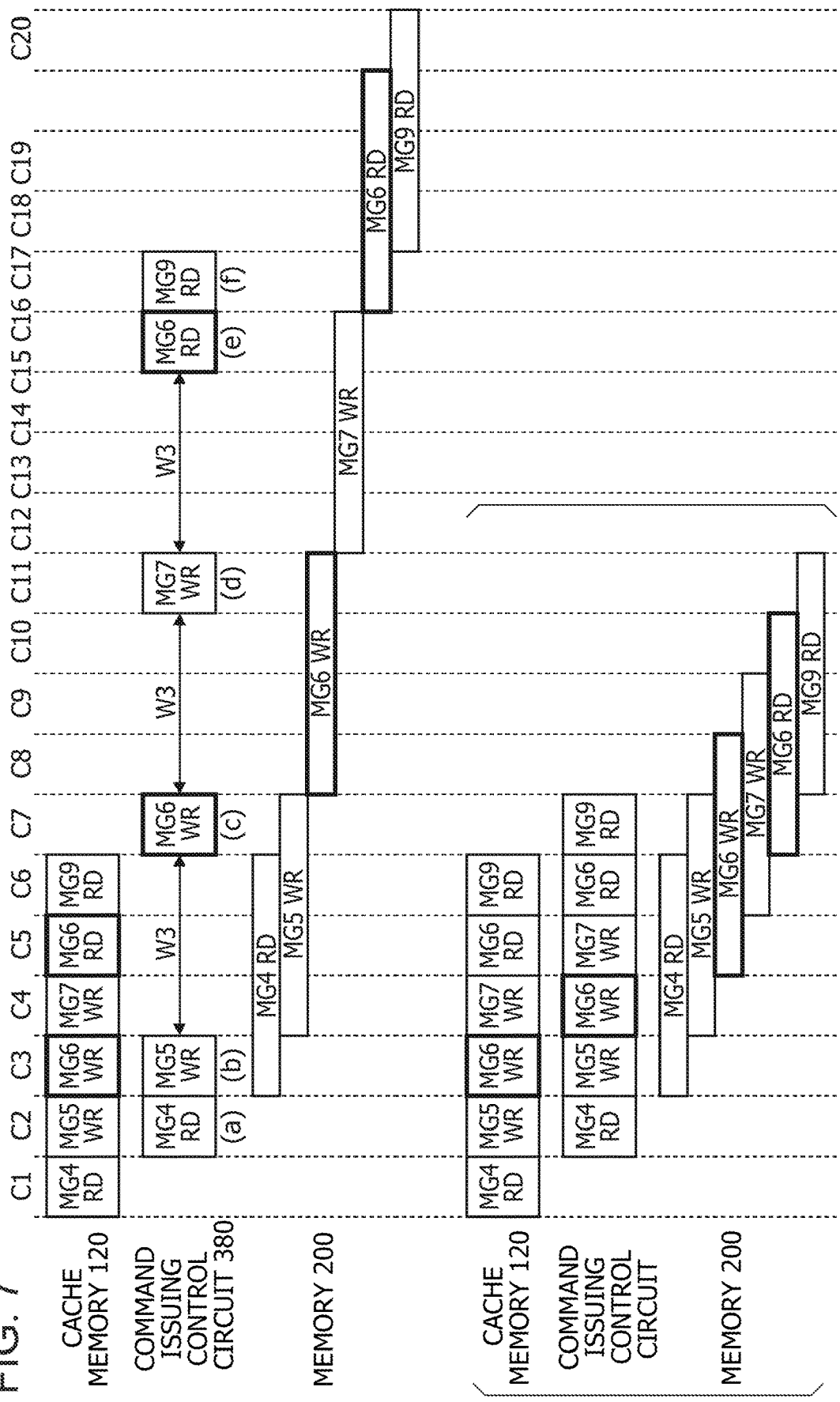
FIG. 7 is a diagram illustrating an example of an operation of an information processing apparatus illustrated in FIG. 3.
Figure 8:
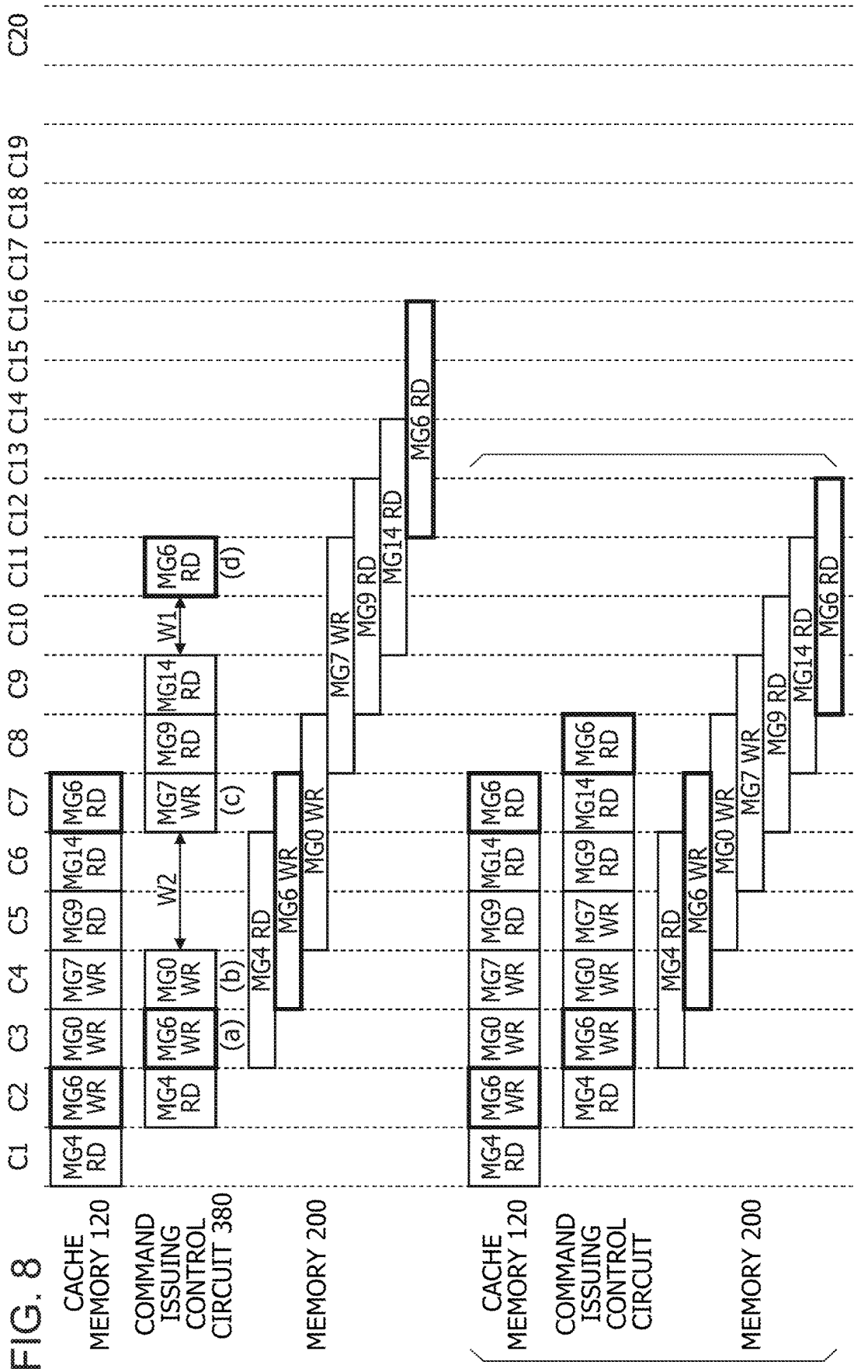
FIG. 8 is a diagram illustrating another example of the operation of the information processing apparatus illustrated in FIG. 3.

As a result, as illustrated in FIGS. 7 and 8, it is possible to suppress an occurrence of a situation in which the access operation for the target storage area MR and the access operation for the adjacent storage area group MG which is adjacent to the storage area group MG including the target storage area MR are performed in a state of overlapping each other. Accordingly, it is possible to reduce the probability of an error occurring by noise which occurs due to an operation of the adjacent storage area group MG, in the access operation performed in the target storage area MR. The state machine 388 determines a state of the access operation by the memory 200, based on the timing mechanism of the memory 200, which operates based on the reception of the memory access request MREQ, and updates a predetermined time measured by the timer 389, based on the determined state.

FIG. 5 illustrates an example of the memory circuit 210 illustrated in FIG. 3. The memory circuit 210 includes 8 memory chips MC (MC0 to MC7) which are stacked, and each of the memory chips MC has 16 storage areas MR (MR0 to MR15). The plurality of memory chips MC are connected to each other by a plurality of TSVs that respectively penetrate the memory chips MC. The number of memory chips MC of the memory circuit 210 is not limited to 8 and the number of storage areas MR in each of the memory chips MC is not limited to 16. A semiconductor substrate of the memory chips MC is not limited to a silicon substrate.

In each of the memory chips MC0 to MC7, the storage areas MR0 to MR15 may be independently accessed and access operations may be performed in a period of overlapping each other. In the memory chips MC0 to MC7, the storage areas MR having the same number at the tail are connected to each other by the common through electrode group VG (VG0 to VG15) including plural number of TSVs. The storage areas MR connected to each other by the common through electrode group VG are included in the storage area group MG (MG0 to MG15). The number appended to the reference sign MR of the storage area included in each storage area group MG is the same as the number appended to the reference sign MG of the storage area group and the number appended to the reference sign VG of the through electrode group.

For example, the memory chips MC0 to MC7 are identified by addresses AD [6:4] of 3 bits. The storage areas MR0 to MR15 of each of the memory chips MC0 to MC7 are identified by addresses AD [3:0] of 4 bits. Therefore, the storage area groups MG0 to MG15 and the through electrode group VG may be identified by the addresses AD [3:0]. FIG. 6 illustrates an example of the addresses AD [3:0] which are respectively assigned to the storage areas MR0 to MR15. Thus, the address decoder 342 illustrated in FIG. 3 can select the counter 344 which is to update the counter value CNT, based on 4 bits corresponding to the address AD [3:0] among bits of the error address ERRA output from the address filter circuit 320.

In a case where the bit positions of the addresses AD for identifying the storage areas MR included in each of the storage area groups MG are different for each of the memory chips MC0 to MC7, it is difficult to identify the storage area groups MG0 to MG15 by the common address AD of 3 bits. In addition, it is difficult to identify the through electrode groups VG0 to VG15 by the common address AD of 3 bits. In this case, the storage area group MG and the through electrode group VG are identified based on the values of the addresses AD of 3 bits, which are respectively assigned to the storage areas MR0 to MR15 for each memory chip MC. For example, the address decoder 342 holds information indicating a through electrode group VG to which the storage areas MR0 to MR15 of each of the memory chips MC0 to MC7 are connected. The address decoder 342 illustrated in FIG. 3 selects the counter 344 which is to update the counter value CNT, based on the error address ERRA output from the address filter circuit 320, for each memory chip MC.

The plurality of storage areas MR included in each storage area group MG commonly use the through electrode group VG, and thus it is not possible to perform access operations in a state of overlapping each other. Therefore, in a case where a memory access request to one storage area group MG in which the number of times of correcting an error has exceeded the threshold value VT is continuously output from the cache memory 120, the command issuing control circuit 380 sequentially outputs the memory access request with interposing a wait cycle having a predetermined number of cycles.

FIG. 6 illustrates an example of arrangement of the storage area groups MG0 to MG15 included in the memory circuit 210 illustrated in FIG. 5. In FIG. 6, regarding storage area groups MG0 to MG15, 4 storage area groups are arranged in a vertical direction of the memory chips MC0 to MC7 and 4 storage area groups are arranged in a horizontal direction thereof.

The storage area group MG6 indicated by a thick frame indicates being in at least any state of "the number of times of correcting an error has exceeded the threshold value VT", "an uncorrectable error has previously occurred", and "the number of times of correcting an error has been previously greater than the threshold value VT". That is, the storage area group MG6 is a target storage area group in which a correctable error occurs randomly and easily by noise and the like, in comparison to other storage area groups MG. The storage area groups MG1 to MG5 and MG7 to MG15 are non-target storage area groups in which a correctable error by noise and the like occurs less frequently than the storage area group MG6. The storage area groups MG2, MG5, MG7, and MG10 which respectively face the sides of the storage area group MG6 are adjacent storage area groups which are adjacent to the storage area group MG6 as the target storage area group.

The area information output circuit 360 illustrated in FIG. 3 determines that "the number of times of correcting an error has exceeded the threshold value VT", based on the counter value CNT of the counter 344. The area information output circuit 360 determines that "an uncorrectable error has previously occurred", based on the previous error information PUE held by the information holding circuit 346. The area information output circuit 360 determines that "the number of times of correcting an error has been previously greater than the threshold value VT", based on the previous excess information PCE held by the information holding circuit 348.

FIG. 7 illustrates an example of an operation of the information processing apparatus illustrated in FIG. 3. That is, FIG. 7 illustrates an example of the memory access method by the memory controller 300 that controls the access to the memory 200. Detailed descriptions of operations similar to those in FIG. 2 will not be repeated. Operations illustrated in a lower bracket in FIG. 7 illustrate an example of an operation of the information processing apparatus including the memory controller including the request issuing circuit that outputs a received memory access request to the memory 200 whenever the memory access request is received from the cache memory 120, similar to the operations illustrated in the lower bracket in FIG. 2.

The command issuing control circuit 380 (FIG. 4) receives a read access request to the non-target storage area group MG4 in a cycle C1. The coincidence determination circuit 382 determines to be discordance. The overlap determination circuit 386 determines not to overlap an access operation for the target storage area group MG6. Therefore, the command issuing control circuit 380 does not start the timer 389 and outputs the read access request to the non-target storage area group MG4, to the memory 200 in a cycle C2 next to the cycle C1 in which the read access request has been received ((a) in FIG. 7). Similar to the read access request received in the cycle C1, the command issuing control circuit 380 processes a write access request to the non-target storage area group MG5 received in the cycle C2 ((b) in FIG. 7).

The command issuing control circuit 380 receives a write access request to the target storage area group MG6 in a cycle C3. The coincidence determination circuit 382 determines to be coincidence. The overlap determination circuit 384 determines to overlap an access operation for the adjacent storage area group MG5. Therefore, the command issuing control circuit 380 starts the timer 389 in the cycle C3 and inserts a wait cycle W3 of 3 cycles. Then, the command issuing control circuit 380 outputs the write access request to the target storage area group MG6, to the memory 200 in a cycle C7 ((c) in FIG. 7).

The command issuing control circuit 380 receives a write access request to the non-target storage area group MG7 in a cycle C4. The coincidence determination circuit 382 determines to be discordance. The overlap determination circuit 386 determines to overlap an access operation for the target storage area group MG6. Therefore, the command issuing control circuit 380 starts the timer 389 in the cycle C7 and inserts a wait cycle W3 of 3 cycles. Then, the command issuing control circuit 380 outputs the write access request to the non-target storage area group MG7, to the memory 200 in a cycle C11 ((d) in FIG. 7).

The command issuing control circuit 380 receives a read access request to the target storage area group MG6 in a cycle C5. The coincidence determination circuit 382 determines to be coincidence. The overlap determination circuit 384 determines to overlap an access operation for the adjacent storage area group MG7. Therefore, the command issuing control circuit 380 starts the timer 389 in the cycle C11 and inserts a wait cycle W3 of 3 cycles. Then, the command issuing control circuit 380 outputs the read access request to the target storage area group MG6, to the memory 200 in a cycle C15 ((e) in FIG. 7).

The command issuing control circuit 380 receives a read access request to the non-target storage area group MG9 in a cycle C6. The coincidence determination circuit 382 determines to be discordance. The overlap determination circuit 386 determines not to overlap an access operation for the target storage area group MG6. Therefore, the command issuing control circuit 380 does not start the timer 389 and outputs the read access request to the non-target storage area group MG9, to the memory 200 in a cycle C16 next to the cycle C5 in which the read access request to the target storage area group MG6 has been output ((f) in FIG. 7).

With the above descriptions, the memory 200 can perform the access operation for the target storage area group MG6 and the access operations for the adjacent storage area groups MG5 and MG7 without overlapping each other. Thus, it is possible to reduce noise occurring by an influence of the access operations for the adjacent storage area groups MG5 and MG7, in the through electrode group VG for the target storage area group MG6 in which a random error occurs easier than other storage area groups MG. Accordingly, it is possible to suppress the occurrence of an uncorrectable error and to suppress the decrease of reliability.

FIG. 8 illustrates another example of the operation of the information processing apparatus illustrated in FIG. 3. That is, FIG. 8 illustrates another example of the memory access method by the memory controller 300 that controls the access to the memory 200. Detailed descriptions of operations similar to those in FIGS. 2 and 7 will not be repeated.

The command issuing control circuit 380 (FIG. 4) receives a write access request to the target storage area group MG6 in a cycle C2. The coincidence determination circuit 382 determines to be coincidence. The overlap determination circuit 384 determines not to overlap an access operation for the adjacent storage area group MG. Therefore, the command issuing control circuit 380 does not start the timer 389 and outputs the write access request to the target storage area group MG6, to the memory 200 in a cycle C3 next to the cycle C2 in which the write access request has been received ((a) in FIG. 8).

The command issuing control circuit 380 receives a write access request to the non-target storage area group MG0 in a cycle C3. The coincidence determination circuit 382 determines to be discordance. The overlap determination circuit 386 determines not to overlap an access operation for the target storage area group MG6. Therefore, the command issuing control circuit 380 does not start the timer 389 and outputs the write access request to the non-target storage area group MG0, to the memory 200 in a cycle C4 next to the cycle C13 in which the write access request to the target storage area group MG has been output ((b) in FIG. 8).

The command issuing control circuit 380 receives a write access request to the non-target storage area group MG7 in a cycle C4. The coincidence determination circuit 382 determines to be discordance. The overlap determination circuit 386 determines to overlap an access operation for the target storage area group MG6. Therefore, the command issuing control circuit 380 starts the timer 389 in the cycle C4 and inserts a wait cycle W2 of 2 cycles. Then, the command issuing control circuit 380 outputs the write access request to the non-target storage area group MG7, to the memory 200 in a cycle C7 ((c) in FIG. 8).

The command issuing control circuit 380 receives a read access request to the target storage area group MG6 in the cycle C7. The coincidence determination circuit 382 determines to be coincidence. The overlap determination circuit 384 determines to overlap an access operation for the adjacent storage area group MG7. Therefore, the command issuing control circuit 380 starts the timer 389 in a cycle C9 and inserts a wait cycle W1 of 1 cycle. Then, the command issuing control circuit 380 outputs the read access request to the target storage area group MG6, to the memory 200 in a cycle C11 ((d) in FIG. 8). The state machine 388 in the command issuing control circuit 380 changes the predetermined time to be measured by the timer 389, so as to match with a period in which access operations overlap each other. Thus, it is possible to efficiently output the memory access request MREQ to the memory 200 in comparison to a case where the predetermined time is fixed to the wait cycle W3.

FIG. 9 illustrates an example of an operation of the address filter circuit 320 illustrated in FIG. 3. The operation illustrated in FIG. 9 is started whenever a response RES in response to a read access request is received from the command receiving control circuit 390.

Firstly, in Step S10, the output control circuit 324 in the address filter circuit 320 causes the operation to proceed to Step S12 in a case where the response RES received from the command receiving control circuit 390 includes error information CE and ends the operation in a case where the response RES does not include the error information CE. In Step S12, the output control circuit 324 determines whether or not any of entries in the error history holding circuit 322 holds an address AD included in the response RES. In a case where no entry in the error history holding circuit 322 holds the address AD, the output control circuit 324 causes the operation to proceed to Step S14 in order to store information corresponding to the response RES in an entry in the error history holding circuit 322.

In a case where any of the entries in the error history holding circuit 322 holds the address AD, the output control circuit 324 ends the operation because an error in data at the same address AD has previously corrected. There is a high probability that the error occurring in data at the same address AD occurs by a physical defect. In this case, Step S16 which will be described later is not performed, and thus the output control circuit 324 does not output the address AD included in the response RES to the counter 340.

In Step S14, the output control circuit 324 stores the address AD included in the response RES, in an empty entry in the error history holding circuit 322, and sets the validity flag V to be in a valid state. The output control circuit 324 determines that an entry having the validity flag V in an invalid state is an empty entry. In Step S16, the output control circuit 324 outputs the address AD included in the response RES, as an error address ERRA, to the counter 340, and then ends the operation. With the above operations, the address filter circuit 320 can output an address AD of a correctable error which randomly occurs by noise except for an address AD of a correctable error occurring by a physical defect, to the counter 340.

FIG. 10 illustrates an example of an operation of the counter 340 illustrated in FIG. 3. The operation illustrated in FIG. 10 is performed at a predetermined frequency.

First, in Step S20, the counter 340 causes the operation to proceed to Step S22 in a case where an address UEAD is received from the service processor 710 and causes the operation to proceed to Step S24 in a case where the address UEAD is not received from the service processor 710. In Step S22, the counter 340 sets previous error information PUE held by the information holding circuit 346 corresponding to the address UEAD received from the service processor 710, to logic 1 and causes the operation to proceed to Step S24.

In Step S24, the counter 340 causes the operation to proceed to Step S26 in a case where an address CEAD is received from the service processor 710 and causes the operation to proceed to Step S28 in a case where the address CEAD is not received from the service processor 710. In Step S26, the counter 340 sets previous excess information PCE held by the information holding circuit 348 corresponding to the address CEAD received from the service processor 710, to logic 1 and causes the operations to proceed to Step S28.

In Step S28, the counter 340 causes the operation to proceed to Step S29 in a case where an error address ERRA is received from the address filter circuit 320 and ends the operation in a case where the error address ERRA is not received from the address filter circuit 320. In Step S29, the counter 340 increases the counter value CNT of the counter 344 corresponding to the error address ERRA received from the address filter circuit 320, by "1" and ends the operation.

FIG. 11 illustrates an example of an operation of the area information output circuit 360 illustrated in FIG. 3. The operation illustrated in FIG. 11 is performed at a predetermined frequency.

Firstly, in Step S30, the area information output circuit 360 causes the operation to proceed to Step S32 in a case where the information holding circuit 346 or 348 holding previous error information PUE of logic 1 or previous excess information PCE of logic 1 is provided. The area information output circuit 360 causes the operation to proceed to Step S34 in a case where the information holding circuit 346 or 348 holding previous error information PUE of logic 1 or previous excess information PCE of logic 1 is not provided. In Step S32, the area information output circuit 360 outputs area information MGINF which corresponds to the information holding circuit 346 holding the previous error information PUE of logic 1 or to the information holding circuit 348 holding the previous excess information PCE of logic 1, to the issuing control circuit 380. Then, the process proceeds to Step S34. With the operations of Steps S30 and S32, the area information MGINF can be output based on an error occurring in the memory 200 to which the processor 100 which has been previously started has accessed, before the counter value CNT of the counter 344 is greater than the threshold value VT. In other words, it is possible to determine a storage area group MG in which a random error easily occurs by noise, before the counter value CNT of the counter 344 is greater than the threshold value VT.

In Step S34, the area information output circuit 360 causes the operation to proceed to Step S36 in a case where the counter 344 holding the counter value CNT which is greater than the threshold value VT is provided, and ends the operation in a case where the counter 344 holding the counter value CNT which is greater than the threshold value VT is not provided. In Step S36, the area information output circuit 360 outputs the area information MGINF corresponding to the counter 344 holding the counter value CNT which is greater than the threshold value VT, to the command issuing control circuit 380. Then, the operation is ended. In a case where the area information MGINF is output in Step S32, the output state of the area information MGINF is maintained. Thus, a situation in which the same area information MGINF is output again in Step S36 does not occur.

FIG. 12 illustrates an example of an operation of the command issuing control circuit 380 illustrated in FIG. 3. The operation illustrated in FIG. 12 is started whenever a memory access request MREQ0 is received from the cache memory 120.

Firstly, in Step S40, the coincidence determination circuit 382 in the command issuing control circuit 380 determines whether or not the memory access request MREQ0 received from the cache memory 120 corresponds to the area information MGINF output from the area information output circuit 360. That is, the coincidence determination circuit 382 determines whether the memory access request MREQ0 is a request for the target storage area group MG in which a correctable error by noise and the like occurs easily and randomly. In a case where the memory access request MREQ0 is the request for the target storage area group MG, the operation proceeds to Step S42. In a case where the memory access request MREQ0 is not the request for the target storage area group MG, the operation proceeds to Step S44.

In Step S42, the overlap determination circuit 384 in the command issuing control circuit 380 determines whether or not an access operation for the target storage area group MG corresponding to the memory access request MREQ0 overlaps an access operation for the adjacent storage area group MG which is adjacent to the target storage area group MG. In a case where the access operations overlap each other, the operation proceeds to Step S46. In a case where the access operations do not overlap each other, the operation proceeds to Step S48.

In Step S44, the overlap determination circuit 386 in the command issuing control circuit 380 causes the operation to proceed to Step S46 in a case where a storage area group MG which corresponds to the memory access request MREQ0, and for which the access operation is performed is adjacent to the target storage area group MG for which the access operation is performed. In a case where the storage area group MG which corresponds to the memory access request MREQ0, and for which the access operation is performed is not adjacent to the target storage area group MG for which the access operation is performed, the overlap determination circuit 386 causes the operation to proceed to Step S48.

In Step S46, the state machine 388 in the command issuing control circuit 380 sets the timer 389 and waits for elapsing of cycles of a predetermined number. Then, the state machine 388 causes the operation to proceed to Step S48. In Step S48, the state machine 388 outputs the memory access request MREQ0 as a memory access request MREQ, to the memory 200 and ends the operation.

As described above, it is also possible to obtain an effect similar to that in the embodiment illustrated in FIGS. 1 and 2, in the embodiment illustrated in FIGS. 3 to 12. That is, an address AD of a correctable error which randomly occurs by noise except for an address AD of a correctable error occurring by a physical defect can be output to the counter 340 by the address filter circuit 320. Therefore, it is possible to accurately determine a storage area group MG in which a random error easily occurs by noise, by the area information output circuit 360.

It is possible to perform an access operation for the target storage area group MG and an access operation for a storage area group MG adjacent to the target storage area group MG, without overlapping each other by control of the command issuing control circuit 380 illustrated in FIG. 4. Thus, it is possible to suppress an occurrence of a situation in which a random error occurs in the target storage area group MG by an influence of the operation of the storage area group adjacent to the target storage area group MG, and to suppress the occurrence of an uncorrectable error. As a result, it is possible to reduce a frequency of replacing the memory 200 by the occurrence of an uncorrectable error in data, in comparison to that in the related art. That is, it is possible to improve reliability of the memory 200 and the information processing apparatus in comparison to a processor which does not include the memory controller 300 illustrated in FIG. 3.

Further, in the embodiment illustrated in FIGS. 3 to 12, the area information MGINF can be output based on an error occurring in the memory 200 to which the processor 100 which has been previously started has accessed, before the counter value CNT of the counter 344 is greater than the threshold value VT. In other words, it is possible to determine a storage area group MG in which a random error easily occurs by noise, before the counter value CNT of the counter 344 is greater than the threshold value VT.

Figure 13:
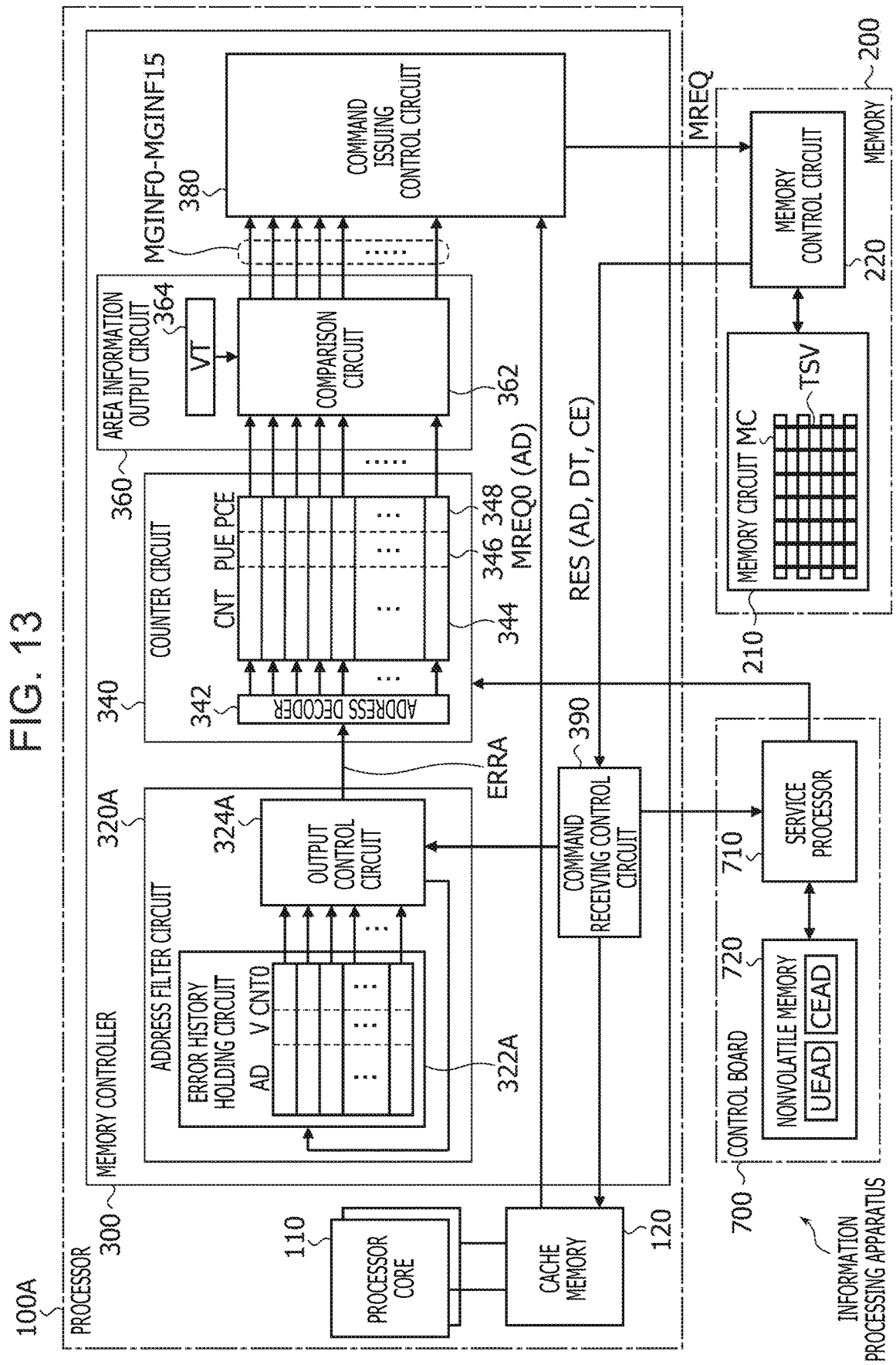
FIG. 13 is a diagram illustrating a processor and a memory access method according to still another embodiment.

FIG. 13 illustrates a processor and a memory access method according to still another embodiment. Components which are the same or similar to the components illustrated in FIGS. 1 and 3 are denoted by the same reference signs and detailed descriptions thereof will be not repeated. A processor 100A illustrated in FIG. 13 includes an address filter circuit 320A instead of the address filter circuit 320 illustrated in FIG. 3. Other components of the processor 100A and an information processing apparatus including the processor 100A are the same as those in FIG. 3.

Figure 14:
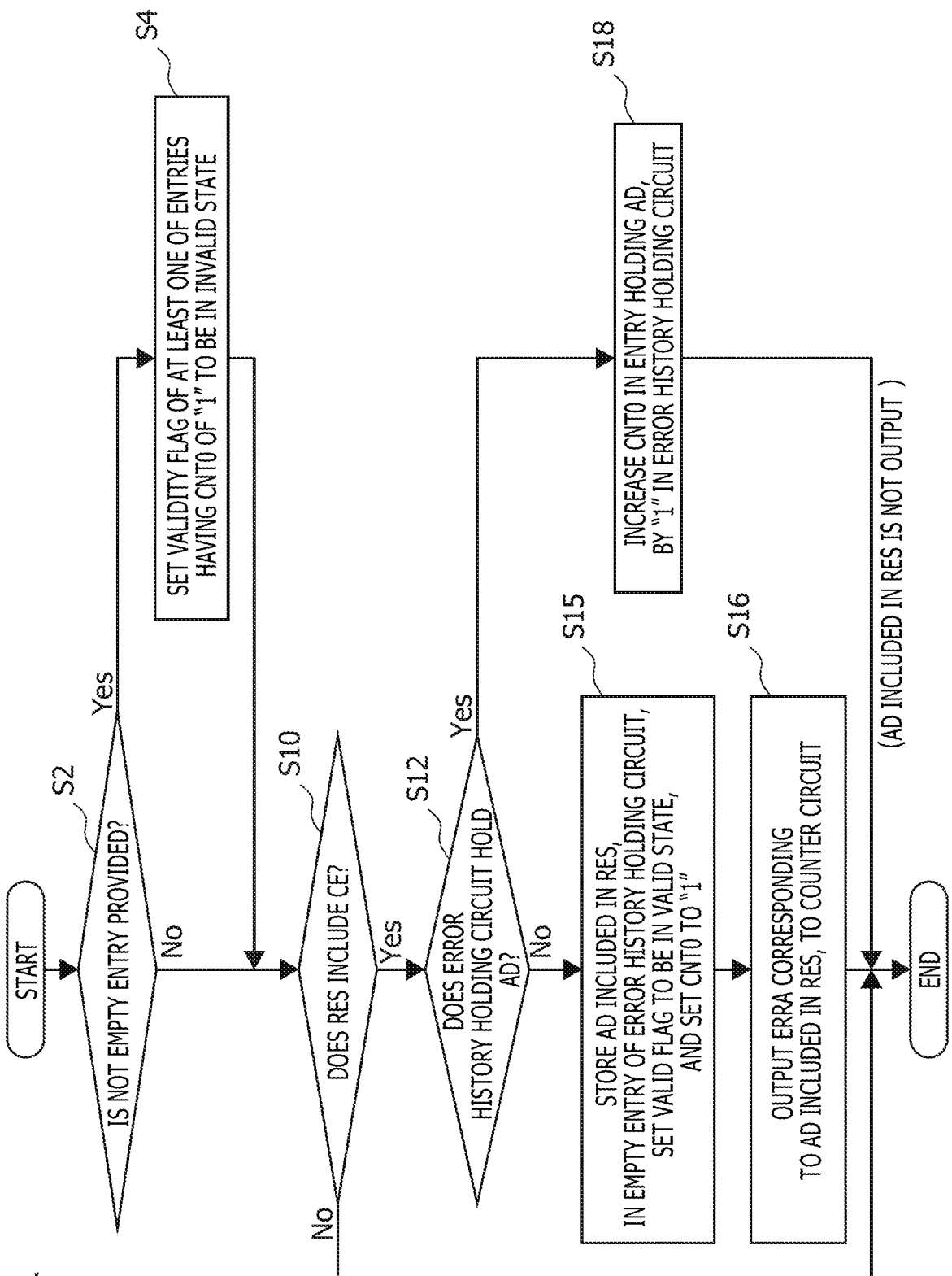
FIG. 14 is a diagram illustrating an example of an operation of an address filter circuit illustrated in FIG. 13.
Figure 15:
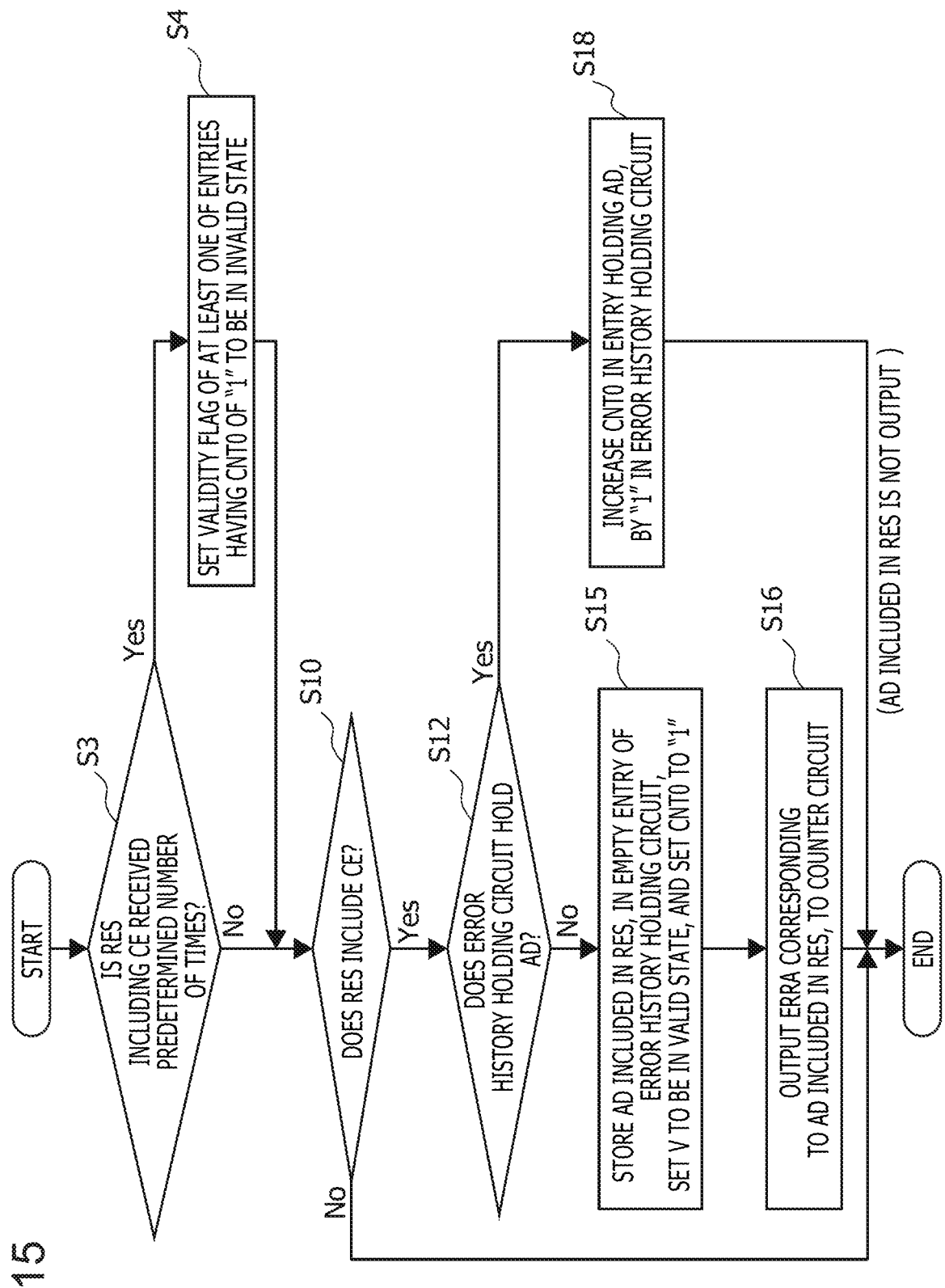
FIG. 15 is a diagram illustrating another example of the operation of the address filter circuit illustrated in FIG. 13.

The address filter circuit 320A includes an error history holding circuit 322A and an output control circuit 324A. The error history holding circuit 322A is the same as the error history holding circuit 322 illustrated in FIG. 3 except for having a function of holding the number of corrections CNT0 which is the number of times of correcting an error, in an entry. The output control circuit 324A is the same as the output control circuit 324 illustrated in FIG. 3 except for having a function of storing the number of corrections CNT0 in the error history holding circuit 322A for each address AD and a function of deleting information in which the number of corrections CNT0 has been held in one entry. FIGS. 14 and 15 illustrate an example of an operation of the address filter circuit 320A.

In the address filter circuit 320A illustrated in FIG. 13, whenever a correctable error occurs at the same address AD and the error is corrected, the number of corrections CNT0 held in an entry corresponding to an address AD in which an error has occurred increases in the error history holding circuit 322A. The address AD held in the entry along with the number of corrections CNT0 of 2 or greater indicates a memory block in which an error has occurred by a physical defect, for example. That is, the address filter circuit 320A can distinguish an error occurring by a physical defect from an error occurring by noise.

For example, in a case where the number of corrections CNT0 held by the error history holding circuit 322A is greater than a predetermined value, the service processor 710 may output a message of urging replacement of the memory 200 to a display device and the like. Thus, the memory 200 can be replaced before an uncorrectable error occurs in the memory 200. Accordingly, it is possible to improve reliability of the information processing apparatus in comparison to a case where the message is not output.

FIG. 14 illustrates an example of an operation of the address filter circuit 320A illustrated in FIG. 13. Components which are the same as those in FIG. 9 are denoted by the same reference signs and detailed descriptions thereof will be not repeated.

Firstly, in Step S2, the output control circuit 324A causes the operation to proceed to Step S4 in a case where an empty entry is not provided in the error history holding circuit 322A and causes the operation to proceed to Step S10 in a case where an empty entry is provided in the error history holding circuit 322A. In Step S4, the output control circuit 324A sets a validity flag V of at least one entry having the number of corrections CNT0 of 1 among a plurality of entries of the error history holding circuit 322A to be in an invalid state and causes the operation to proceed to Step S10. The entry having the validity flag V which is set to be in an invalid state is released and comes to being empty.

With the operations of Steps S2 and S4, it is possible to normally secure an entry for storing an address AD included in a response RES indicating an error has been corrected. A ratio of an entry holding an address AD for an error which occurs by a physical defect increases by repeating the operations of Steps S2 and S4. Thus, the performance of the address filter circuit 320 that excludes an address AD for a correctable error occurring by a physical defect can be gradually improved with following the operation of the address filter circuit 320.

The operation of Step S10 is the same as the operation of Step S10 illustrated in FIG. 9. In Step S12, the output control circuit 324A causes the operation to proceed to Step S18 in a case where any entry in the error history holding circuit 322A holds the address AD included in the response RES. The output control circuit 324A causes the operation to proceed to Step S15 in a case where no entry in the error history holding circuit 322A holds the address AD included in the response RES.

In Step S15, the output control circuit 324A stores the address AD included in the response RES, in an empty entry of the error history holding circuit 322A. The output control circuit 324A sets the validity flag V to be in the valid state and sets the number of corrections CNT0 to once. Then, the output control circuit causes the operation to proceed to Step S16. The operation of Step S16 is the same as the operation of Step S16 illustrated in FIG. 9. In Step S18, the output control circuit 324A increases the number of corrections CNT0 held in the entry along with the address AD included in the response RES in the error history holding circuit 322A, by "1" and ends the operation.

FIG. 15 illustrates another example of the operation of the address filter circuit 320A illustrated in FIG. 13. Operations which are the same as those in FIGS. 9 and 14 are denoted by the same reference signs and detailed descriptions thereof will be not repeated. The operations in FIG. 15 are the same as the operations illustrated in FIG. 14 except that Step S3 instead of Step S2 in FIG. 14 is performed.

In Step S3, the output control circuit 324A causes the operation to proceed to Step S4 in a case where the response RES including error information CE is received a predetermined number of times and causes the operation to proceed to Step S10 in a case where the response RES including error information CE is not received a predetermined number of times. For example, the predetermined number of times has a value which is smaller than the number of entries in the error history holding circuit 322A.

Similar to FIG. 14, with the operations of Steps S3 and S4, it is possible to normally secure an entry for storing an address AD included in a response RES indicating an error has been corrected. The performance of the address filter circuit 320 that excludes an address AD for a correctable error occurring by a physical defect can be improved with following the operation of the address filter circuit 320.

As described above, it is also possible to obtain an effect similar to that in the embodiments illustrated in FIGS. 1 to 12, in the embodiment illustrated in FIGS. 13 to 15. Further, in the embodiment illustrated in FIGS. 13 to 15, it is possible to normally secure an entry for storing an address AD included in a response RES indicating an error has been corrected. The performance of the address filter circuit 320 that excludes an address AD for a correctable error occurring by a physical defect can be gradually improved with following the operation of the address filter circuit 320.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A processor comprising:
    a memory controller that controls an access to a memory which includes a plurality of through electrode groups and a memory chip including a plurality of storage areas connected to the plurality of through electrode groups, each of the through electrode groups including a plurality of through electrodes, wherein the memory controller comprises:

an address-filter circuit that outputs an access address included in a read access request of reading data from the memory, as an error address, the address-filter circuit outputs the access address as the error address when a response which is output from the memory, in response to the read access request, includes error information indicating that an error in the data has been corrected by the memory and when it is determined that the error in the data at the access address included in the read access request has been corrected for a first time, a counter that includes a plurality of counters corresponding to the plurality of through electrode groups and updates a counter value of the counter corresponding to the through electrode group connected to the storage area indicated by the received error address, an area-information-output circuit that outputs area information indicating the storage area connected to the through electrode group corresponding to the counter having a counter value which is greater than a predetermined value, and an issuing circuit that outputs, to the memory with a predetermined time gap, an access request to the storage area indicated by the area information output from the area-information-output circuit and an access request to the storage area adjacent to the storage area indicated by the area information output from the area-information-output circuit, the address-filter circuit comprises:
a holding circuit that holds the access address; and
an output control circuit that outputs the error address to the counter and stores the error address in the holding circuit in a case where the response to the read access request includes the error information and an access address included in the response to the read access request is not held in the holding circuit, and that hinders an output of the error address to the counter in a case where the response to the read access request includes the error information and the access address included in the response to the read access request is held in the holding circuit.

2. The processor according to claim 1, wherein the issuing circuit comprises
a coincidence determination circuit that determines whether a storage area, as an access target, which is indicated by an access address included in the access request output to the memory coincides with any storage area indicated by the area information output by the area-information-output circuit,
a first overlap-determination circuit that determines whether an access operation for the storage area as the access target overlaps an access operation for the storage area adjacent to the storage area as the access target, in a case where the coincidence determination circuit determines that the storage area as the access target coincides with the any storage area indicated by the area information,
a second overlap-determination circuit that determines whether the access operation for the storage area as the access target overlaps an access operation for the storage area corresponding to the area information output by the area-information-output circuit among the storage areas adjacent to the storage area as the access target, in a case where the coincidence determination circuit determines that the storage area as the access target does not coincide with the any storage area indicated by the area information, and
a timing adjustment circuit that causes an output of the access request to the memory to wait until a timing when the access operations do not overlap each other, in a case where the first overlap-determination circuit or the second overlap-determination circuit determines that the access operations overlap each other.

3. The processor according to claim 2, wherein the timing adjustment circuit comprises a timer which is started in a case where the first overlap-determination circuit or the second overlap-determination circuit determines that the access operations overlap each other and hinders the output of the access request to the memory until the timer completes measurement of a predetermined time.

4. The processor according to claim 1, wherein
the holding circuit comprises a plurality of entries for holding the number of corrections indicating the number of times of correcting an error in data, along with the access address, and
the output control circuit
stores the access address in any empty entry and sets the number of corrections held in the entry for storing the access address to be once, in a case where the response to the read access request includes the error information and a case where the access address included in the response is not held in any of the plurality of entries,
updates the number of corrections held in the entry for holding the access address, in a case where the response to the read access request includes the error information and a case where the access address included in the response is held by any of the plurality of entries, and
releases at least one of entries in which the number of corrections is once among the plurality of entries, in a case where all the plurality of entries hold access addresses.

5. The processor according to claim 1, wherein
the holding circuit includes a plurality of entries for holding the number of corrections indicating the number of times of correcting an error in data, along with the access address, and
the output control circuit
stores the access address in any empty entry and sets the number of corrections held in the entry for storing the access address to be once, in a case where the response to the read access request includes the error information and a case where the access address included in the response is not held by any of the plurality of entries,
updates the number of corrections held in the entry for holding the access address, in a case where the response to the read access request includes the error information and a case where the access address included in the response is held by any of the plurality of entries, and
releases at least one of entries in which the number of corrections is once among the plurality of entries, whenever the response including the error information is received a predetermined number of times.

6. The processor according to claim 1, wherein the output control circuit stores bits of a predetermined number in the access address included in the read access request, as an access address, in the holding circuit, the bits being used for selecting a plurality of memory blocks included in each of the plurality of storage areas.

7. The processor according to claim 1, wherein
the counter comprises a plurality of first information holding circuits that hold previous excess information so as to respectively correspond to the plurality of counters, the previous excess information indicating that the number of times of the memory for correcting an error in data, which occurs in the storage area connected to the through electrode group, has been previously greater than a predetermined value, and the area-information-output circuit outputs area information indicating the storage area connected to the through electrode group corresponding to the first information holding circuit that holds the previous excess information, to the issuing circuit regardless of the counter value of the counter corresponding to the first information holding circuit that holds the previous excess information, in a case where any of the plurality of first information holding circuits holds the previous excess information.

8. The processor according to claim 1, wherein the counter comprises a plurality of second information holding circuits that hold previous error information, so as to respectively correspond to the plurality of counters, the previous error information indicating that an uncorrectable error in data has previously occurred in the storage area connected to the through electrode group, and the area-information-output circuit outputs area information indicating the storage area connected to the through electrode group corresponding to the second information holding circuit that holds the previous error information, to the issuing circuit regardless of the counter value of the counter corresponding to the second information holding circuit that holds the previous error information, in a case where any of the plurality of second information holding circuits holds the previous error information.

9. The processor according to claim 1, wherein the error address output to the counter by the address-filter circuit is bits of a predetermined number in the access address included in the read access request, the bits being used for selecting a plurality of memory blocks included in each of the plurality of storage areas.

10. The processor according to claim 1, wherein the memory controller further comprises a detection circuit detecting that the response to the read access request includes the error information.

11. The processor according to claim 1, wherein the memory includes a plurality of memory chips which are connected to each other via the plurality of through electrode groups, the counter updates the counter value of the counter for each of the storage area groups including a plurality of storage areas connected to each of the plurality of through electrode groups among a plurality of storage areas provided in each of a plurality of memory chips, and the issuing circuit outputs an access request to the storage area indicated by the area information and an access request to the storage area included in the storage area group adjacent to the storage area group including the storage area indicated by the area information, to the memory with a predetermined time gap.

12. A memory access method by a memory controller that controls an access to a memory which comprises a plurality of through electrode groups and a memory chip including a plurality of storage areas connected to the plurality of through electrode groups, each of the through electrode groups including a plurality of through electrodes, the method comprising:

outputting an access address included in a read access request, as an error address, by an address-filter circuit of the memory controller in when a response output from the memory, in response to the read access request of reading data from the memory, includes error information indicating that an error in the data has been corrected in the memory and when it is determined that the error in the data at the access address included in the read access request has been corrected for a first time, the address-filter circuit comprises:

a holding circuit that holds the access address, and an output control circuit that outputs the error address to the counter and stores the error address in the holding circuit in a case where the response to the read access request includes the error information and an access address included in the response to the read access request is not held in the holding circuit, and that hinders an output of the error address to the counter in a case where the response to the read access request includes the error information and the access address included in the response to the read access request is held in the holding circuit;

updating a counter value of a counter corresponding to the through electrode group connected to the storage area indicated by the received error address among a plurality of counters provided to respectively correspond to the plurality of through electrode groups, by a counter of the memory controller;

outputting area information by an area-information-output circuit of the memory controller, the area information indicating the storage area connected to the through electrode group corresponding to the counter having a counter value which is greater than a predetermined value; and outputting, to the memory with a predetermined time gap from an issuing circuit of the memory controller, an access request to the storage area indicated by the area information output from the area-information-output circuit and an access request to the storage area adjacent to the storage area indicated by the area information output from the area-information-output circuit, to the memory with a predetermined time gap by an issuing circuit of the memory controller.

* * * * *